(12) United States Patent
Magnezi

(10) Patent No.: US 10,659,163 B2
(45) Date of Patent: May 19, 2020

(54) SUPPORTING ANALOG REMOTE ANTENNA UNITS (RAUS) IN DIGITAL DISTRIBUTED ANTENNA SYSTEMS (DASS) USING ANALOG RAU DIGITAL ADAPTORS

(71) Applicant: Corning Optical Communications LLC, Charlotte, NC (US)

(72) Inventor: Gavriel Magnezi, Petah Tikva (IL)

(73) Assignee: Corning Optical Communications LLC, Charlotte, NC (US)

( * ) Notice: Subject to any disclaimer, the term of this patent is extended or adjusted under 35 U.S.C. 154(b) by 1092 days.

(21) Appl. No.: 14/496,507

(22) Filed: Sep. 25, 2014

(65) Prior Publication Data
US 2016/0094293 A1 Mar. 31, 2016

(51) Int. Cl.
*H04B 10/2575* (2013.01)

(52) U.S. Cl.
CPC . *H04B 10/25753* (2013.01); *H04B 10/25751* (2013.01); *H04B 10/25752* (2013.01); *H04B 10/25759* (2013.01)

(58) Field of Classification Search
CPC ........ H04B 10/25753; H04B 10/25759; H04B 10/25752; H04B 10/25751
See application file for complete search history.

(56) References Cited

U.S. PATENT DOCUMENTS

| 4,365,865 A | 12/1982 | Stiles |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |

(Continued)

FOREIGN PATENT DOCUMENTS

| AU | 645192 B2 | 1/1994 |
| AU | 731180 B2 | 3/2001 |

(Continued)

OTHER PUBLICATIONS

PCT/IL2015/050978 Invitation to Pay Additional Fees dated Feb. 17, 2016.

(Continued)

*Primary Examiner* — Mina M Shalaby
(74) *Attorney, Agent, or Firm* — C. Keith Montgomery

(57) ABSTRACT

Supporting analog remote antenna units (RAUs) in digital distributed antenna systems (DASs) using analog RAU digital adaptors. In the digital DAS disclosed herein, a head-end equipment (HEE) is configured to exchange digital communications signals with a plurality of digital RAUs. The digital DAS is also configured to distribute digital communications signals to an analog RAU(s), which is not inherently capable of processing the digital communications signals. In this regard, an analog RAU digital adaptor(s) is provided in an analog remote unit to serve as a digital interface for the analog RAU(s). The analog RAU digital adaptor(s) is configured to provide conversions between the digital communications signals and analog RF communications signals. By providing the analog RAU digital adaptor as the digital interface for the analog RAU(s), the digital DAS can be configured to compatibly communicate with the analog RAU(s) and the digital RAU(s).

17 Claims, 9 Drawing Sheets

(56) References Cited

U.S. PATENT DOCUMENTS

| | | |
|---|---|---|
| 4,972,505 A | 11/1990 | Isberg |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,206,655 A | 4/1993 | Caille et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,280,472 A | 1/1994 | Gilhousen et al. |
| 5,295,154 A | 3/1994 | Meier et al. |
| 5,299,947 A | 4/1994 | Barnard |
| 5,301,056 A | 4/1994 | O'Neill |
| 5,339,058 A | 8/1994 | Lique |
| 5,339,184 A | 8/1994 | Tang |
| 5,377,035 A | 12/1994 | Wang et al. |
| 5,379,455 A | 1/1995 | Koschek |
| 5,400,391 A | 3/1995 | Emura et al. |
| 5,404,570 A | 4/1995 | Charas et al. |
| 5,424,864 A | 6/1995 | Emura |
| 5,428,636 A | 6/1995 | Meier |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,499,241 A | 3/1996 | Thompson et al. |
| 5,504,746 A | 4/1996 | Meier |
| 5,519,691 A | 5/1996 | Darcie et al. |
| 5,543,000 A | 8/1996 | Lique |
| 5,544,161 A | 8/1996 | Bigham et al. |
| 5,546,443 A | 8/1996 | Raith |
| 5,553,064 A | 9/1996 | Paff et al. |
| 5,557,698 A | 9/1996 | Gareis et al. |
| 5,574,815 A | 11/1996 | Kneeland |
| 5,598,288 A | 1/1997 | Collar |
| 5,603,080 A | 2/1997 | Kallander et al. |
| 5,615,034 A | 3/1997 | Hori |
| 5,621,786 A | 4/1997 | Fischer et al. |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,684,799 A | 11/1997 | Bigham et al. |
| 5,689,355 A | 11/1997 | Okubo et al. |
| 5,703,602 A | 12/1997 | Casebolt |
| 5,726,984 A | 3/1998 | Kubler et al. |
| 5,774,789 A | 6/1998 | van der Kaay et al. |
| 5,790,536 A | 8/1998 | Mahany et al. |
| 5,790,606 A | 8/1998 | Dent |
| 5,802,173 A | 9/1998 | Hamilton-Piercy et al. |
| 5,802,473 A | 9/1998 | Rutledge et al. |
| 5,805,983 A | 9/1998 | Naidu et al. |
| 5,809,422 A | 9/1998 | Raleigh et al. |
| 5,812,296 A | 9/1998 | Tarusawa et al. |
| 5,818,619 A | 10/1998 | Medved et al. |
| 5,821,510 A | 10/1998 | Cohen et al. |
| 5,825,651 A | 10/1998 | Gupta et al. |
| 5,825,829 A | 10/1998 | Borazjani et al. |
| 5,832,364 A | 11/1998 | Gustafson |
| 5,838,474 A | 11/1998 | Stilling |
| 5,852,651 A | 12/1998 | Fischer et al. |
| 5,854,986 A | 12/1998 | Dorren et al. |
| 5,867,485 A | 2/1999 | Chambers et al. |
| 5,880,863 A | 3/1999 | Rideout et al. |
| 5,881,200 A | 3/1999 | Burt |
| 5,883,882 A | 3/1999 | Schwartz |
| 5,890,055 A | 3/1999 | Chu et al. |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. |
| 5,982,413 A | 11/1999 | Irie et al. |
| 5,983,070 A | 11/1999 | Georges et al. |
| 5,987,303 A | 11/1999 | Dutta et al. |
| 6,005,884 A | 12/1999 | Cook et al. |
| 6,006,105 A | 12/1999 | Rostoker et al. |
| 6,014,546 A | 1/2000 | Georges et al. |
| 6,016,426 A | 1/2000 | Bodell |
| 6,023,625 A | 2/2000 | Myers, Jr. |
| 6,046,992 A | 4/2000 | Meier et al. |
| 6,067,053 A | 5/2000 | Runyon et al. |
| 6,078,622 A | 6/2000 | Boytim et al. |
| 6,088,381 A | 7/2000 | Myers, Jr. |
| 6,112,086 A | 8/2000 | Wala |
| 6,124,957 A | 9/2000 | Goel et al. |
| 6,127,917 A | 10/2000 | Tuttle |
| 6,128,470 A | 10/2000 | Naidu et al. |
| 6,148,041 A | 11/2000 | Dent |
| 6,150,921 A | 11/2000 | Werb et al. |
| 6,157,810 A | 12/2000 | Georges et al. |
| 6,219,553 B1 | 4/2001 | Panasik |
| 6,222,503 B1 | 4/2001 | Gietema et al. |
| 6,223,021 B1 | 4/2001 | Silvia et al. |
| 6,232,870 B1 | 5/2001 | Garber et al. |
| 6,236,789 B1 | 5/2001 | Fitz |
| 6,240,274 B1 | 5/2001 | Izadpanah |
| 6,268,946 B1 | 7/2001 | Larkin et al. |
| 6,292,673 B1 | 9/2001 | Maeda et al. |
| 6,301,240 B1 | 10/2001 | Slabinski et al. |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,244 B1 | 12/2001 | Swartz et al. |
| 6,334,219 B1 | 12/2001 | Hill et al. |
| 6,337,754 B1 * | 1/2002 | Imajo ............... H04B 10/25752 398/115 |
| 6,353,406 B1 | 3/2002 | Lanzl et al. |
| 6,353,600 B1 | 3/2002 | Schwartz et al. |
| 6,356,374 B1 | 3/2002 | Farhan |
| 6,359,714 B1 | 3/2002 | Imajo |
| 6,373,611 B1 | 4/2002 | Farhan et al. |
| 6,374,078 B1 | 4/2002 | Williams et al. |
| 6,374,124 B1 | 4/2002 | Slabinski |
| 6,374,311 B1 | 4/2002 | Mahany et al. |
| 6,389,010 B1 | 5/2002 | Kubler et al. |
| 6,392,770 B1 | 5/2002 | Sasai et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,438,301 B1 | 8/2002 | Johnson et al. |
| 6,438,371 B1 | 8/2002 | Fujise et al. |
| 6,452,915 B1 | 9/2002 | Jorgensen |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,768 B2 | 12/2002 | Marin et al. |
| 6,501,942 B1 | 12/2002 | Weissman et al. |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,523,177 B1 | 2/2003 | Brown |
| 6,525,855 B1 | 2/2003 | Westbrook et al. |
| 6,526,264 B2 | 2/2003 | Sugar et al. |

(56) References Cited

U.S. PATENT DOCUMENTS

| | | |
|---|---|---|
| 6,549,772 B1 | 4/2003 | Chavez et al. |
| 6,556,551 B1 | 4/2003 | Schwartz |
| 6,560,441 B1 | 5/2003 | Sabat, Jr. et al. |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,594,496 B2 | 7/2003 | Schwartz |
| 6,597,325 B2 | 7/2003 | Judd et al. |
| 6,606,430 B2 | 8/2003 | Bartur et al. |
| 6,615,074 B2 | 9/2003 | Mickle et al. |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,675,294 B1 | 1/2004 | Gupta et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,704,579 B2 | 3/2004 | Woodhead et al. |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,826,164 B2 | 11/2004 | Mani et al. |
| 6,826,165 B1 | 11/2004 | Meier et al. |
| 6,826,337 B2 | 11/2004 | Linnell |
| 6,831,901 B2 | 12/2004 | Millar |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler et al. |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,876,852 B1 | 4/2005 | Li et al. |
| 6,879,290 B1 | 4/2005 | Toutain et al. |
| 6,882,833 B2 | 4/2005 | Nguyen |
| 6,883,710 B2 | 4/2005 | Chung |
| 6,885,846 B1 | 4/2005 | Panasik et al. |
| 6,889,060 B2 | 5/2005 | Fernando et al. |
| 6,895,253 B1 | 5/2005 | Carloni et al. |
| 6,909,399 B1 | 6/2005 | Zegelin et al. |
| 6,915,058 B2 | 7/2005 | Pons |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,933,849 B2 | 8/2005 | Sawyer |
| 6,940,916 B1 | 9/2005 | Warner et al. |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,016,308 B1 | 3/2006 | Gallagher |
| 7,020,451 B2 | 3/2006 | Sugar et al. |
| 7,020,473 B2 | 3/2006 | Splett |
| 7,024,166 B2 | 4/2006 | Wallace et al. |
| 7,035,512 B2 | 4/2006 | Van Bijsterveld |
| 7,035,671 B2 | 4/2006 | Solum |
| 7,039,399 B2 | 5/2006 | Fischer |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,710 B1 | 8/2006 | Stoter et al. |
| 7,093,985 B2 | 8/2006 | Lord et al. |
| 7,103,312 B2 | 9/2006 | Judd et al. |
| 7,103,377 B2 | 9/2006 | Bauman et al. |
| 7,106,931 B2 | 9/2006 | Sutehall et al. |
| 7,110,381 B1 | 9/2006 | O'Sullivan et al. |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,133,697 B2 | 11/2006 | Judd et al. |
| 7,142,503 B1 | 11/2006 | Grant et al. |
| 7,142,535 B2 | 11/2006 | Kubler et al. |
| 7,160,032 B2 | 1/2007 | Nagashima et al. |
| 7,181,206 B2 | 2/2007 | Pedersen |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,245,603 B1 | 7/2007 | Lucidarme et al. |
| 7,257,328 B2 | 8/2007 | Levinson et al. |
| 7,263,293 B2 | 8/2007 | Ommodt et al. |
| 7,269,311 B2 | 9/2007 | Kim et al. |
| 7,277,679 B1 | 10/2007 | Barratt et al. |
| 7,286,507 B1 * | 10/2007 | Oh .................. H04W 16/26 370/312 |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,442,679 B2 | 10/2008 | Stolte et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,457,646 B2 | 11/2008 | Mahany et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,493,129 B1 | 2/2009 | Mostafa et al. |

(56) References Cited

U.S. PATENT DOCUMENTS

| | | |
|---|---|---|
| 7,496,070 B2 | 2/2009 | Vesuna |
| 7,496,384 B2 | 2/2009 | Seto et al. |
| 7,522,552 B2 | 4/2009 | Fein et al. |
| 7,542,452 B2 | 6/2009 | Penumetsa |
| 7,548,695 B2 | 6/2009 | Wake |
| 7,551,641 B2 | 6/2009 | Pirzada et al. |
| 7,552,246 B2 | 6/2009 | Mahany et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,599,420 B2 | 10/2009 | Forenza et al. |
| 7,606,594 B2 | 10/2009 | Jesse et al. |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,153 B2 | 2/2010 | Zavadsky |
| 7,668,565 B2 | 2/2010 | Ylänen et al. |
| 7,664,709 B2 | 3/2010 | Ray et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,715,466 B1 | 5/2010 | Oh et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,764,978 B1 | 7/2010 | West |
| 7,768,951 B2 | 8/2010 | Kubler et al. |
| 7,773,573 B2 | 8/2010 | Chung et al. |
| 7,778,603 B2 | 8/2010 | Palin et al. |
| 7,783,263 B2 | 8/2010 | Sperlich et al. |
| 7,787,854 B2 | 8/2010 | Conyers et al. |
| 7,805,073 B2 | 9/2010 | Sabat, Jr. et al. |
| 7,809,012 B2 | 10/2010 | Ruuska et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,145 B2 | 3/2011 | Mahany et al. |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,962,042 B2 | 6/2011 | Deas |
| 7,962,176 B2 | 6/2011 | Li et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,005,152 B2 | 8/2011 | Wegener |
| 8,010,116 B2 | 8/2011 | Scheinert |
| 8,018,907 B2 | 9/2011 | Kubler et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,135,102 B2 | 3/2012 | Wiwel et al. |
| 8,155,525 B2 | 4/2012 | Cox |
| 8,174,428 B2 | 5/2012 | Wegener |
| 8,208,434 B2 | 6/2012 | Sayana et al. |
| 8,213,401 B2 | 7/2012 | Fischer et al. |
| 8,270,387 B2 | 9/2012 | Cannon et al. |
| 8,274,929 B2 | 9/2012 | Schmidt et al. |
| 8,279,800 B2 | 10/2012 | Schmidt et al. |
| 8,290,483 B2 | 10/2012 | Sabat, Jr. et al. |
| 8,306,563 B2 | 11/2012 | Zavadsky et al. |
| 8,346,091 B2 | 1/2013 | Kummetz et al. |
| 8,346,160 B2 | 1/2013 | Kummetz |
| 8,346,278 B2 | 1/2013 | Wala et al. |
| 8,422,884 B2 | 4/2013 | Mao |
| 8,428,510 B2 | 4/2013 | Stratford et al. |
| 8,457,562 B2 | 6/2013 | Zavadsky et al. |
| 8,462,683 B2 | 6/2013 | Uyehara et al. |
| 8,467,823 B2 | 6/2013 | Seki et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,532,566 B2 | 9/2013 | Dussmann |
| 8,548,526 B2 | 10/2013 | Schmidt et al. |
| 8,583,100 B2 | 11/2013 | Koziy et al. |
| 8,626,245 B2 | 1/2014 | Zavadsky et al. |
| 8,634,766 B2 | 1/2014 | Hobbs et al. |
| 8,681,917 B2 | 3/2014 | McAllister et al. |
| 8,682,338 B2 | 3/2014 | Lemson et al. |
| 8,693,342 B2 | 4/2014 | Uyehara et al. |
| 8,694,034 B2 | 4/2014 | Notargiacomo |
| 8,699,982 B2 | 4/2014 | Singh |
| 8,737,300 B2 | 5/2014 | Stapleton et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,792,933 B2 | 7/2014 | Chen |
| 8,837,659 B2 | 9/2014 | Uyehara et al. |
| 8,837,940 B2 | 9/2014 | Smith et al. |
| 8,908,607 B2 | 12/2014 | Kummetz et al. |
| 8,929,288 B2 | 1/2015 | Stewart et al. |
| 8,948,816 B2 | 2/2015 | Fischer et al. |
| 8,958,789 B2 | 2/2015 | Bauman et al. |
| 8,976,067 B2 | 3/2015 | Fischer |
| 9,001,811 B2 | 4/2015 | Wala et al. |
| 9,037,143 B2 | 5/2015 | Berlin et al. |
| 9,042,732 B2 | 5/2015 | Cune et al. |
| 9,270,374 B2 | 2/2016 | Cune et al. |
| 9,325,429 B2 | 4/2016 | Berlin et al. |
| 9,525,488 B2 | 12/2016 | Beamon et al. |
| 9,602,176 B2 | 3/2017 | Schmid et al. |
| 9,642,102 B2 | 5/2017 | Machida |
| 2001/0000621 A1 | 5/2001 | Mitsuda et al. |
| 2001/0036163 A1 | 11/2001 | Sabat, Jr. et al. |
| 2001/0053011 A1 | 12/2001 | Imajo |
| 2002/0003645 A1 | 1/2002 | Kim et al. |
| 2002/0012336 A1 | 1/2002 | Hughes et al. |
| 2002/0012495 A1 | 1/2002 | Sasai et al. |
| 2002/0031113 A1 | 3/2002 | Dodds et al. |
| 2002/0048071 A1 | 4/2002 | Suzuki et al. |
| 2002/0055371 A1 | 5/2002 | Arnon et al. |
| 2002/0075906 A1 | 6/2002 | Cole et al. |
| 2002/0090915 A1 | 7/2002 | Komara et al. |
| 2002/0092347 A1 | 7/2002 | Niekerk et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0130778 A1 | 9/2002 | Nicholson |
| 2002/0176354 A1 | 11/2002 | Chiodini |
| 2002/0181668 A1 | 12/2002 | Masoian et al. |
| 2002/0190845 A1 | 12/2002 | Moore |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078052 A1 | 4/2003 | Atias et al. |
| 2003/0078074 A1 | 4/2003 | Sesay et al. |

(56) References Cited

U.S. PATENT DOCUMENTS

| | | |
|---|---|---|
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037300 A1 | 2/2004 | Lehr et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0049321 A1 | 3/2004 | Lehr et al. |
| 2004/0078151 A1 | 4/2004 | Aljadeff et al. |
| 2004/0100930 A1 | 5/2004 | Shapira et al. |
| 2004/0105435 A1 | 6/2004 | Morioka |
| 2004/0106435 A1 | 6/2004 | Bauman et al. |
| 2004/0110469 A1 | 6/2004 | Judd et al. |
| 2004/0126068 A1 | 7/2004 | Van Bijsterveld |
| 2004/0131125 A1 | 7/2004 | Sanderford, Jr. et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0198451 A1 | 10/2004 | Varghese |
| 2004/0202257 A1 | 10/2004 | Mehta et al. |
| 2004/0203339 A1 | 10/2004 | Bauman |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0230846 A1 | 11/2004 | Mancey et al. |
| 2004/0233877 A1 | 11/2004 | Lee et al. |
| 2004/0258105 A1 | 12/2004 | Spathas et al. |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0220458 A1 | 10/2005 | Kupershmidt et al. |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0019604 A1 | 1/2006 | Hasarchi |
| 2006/0045054 A1 | 3/2006 | Utsumi et al. |
| 2006/0053324 A1 | 3/2006 | Giat et al. |
| 2006/0062579 A1 | 3/2006 | Kim et al. |
| 2006/0079290 A1 | 4/2006 | Seto et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0222369 A1 | 10/2006 | Kim et al. |
| 2006/0233506 A1 | 10/2006 | Noonan et al. |
| 2006/0239630 A1 | 10/2006 | Hase et al. |
| 2006/0267843 A1 | 11/2006 | Sakama et al. |
| 2006/0274704 A1 | 12/2006 | Desai et al. |
| 2007/0008939 A1 | 1/2007 | Fischer |
| 2007/0009266 A1 | 1/2007 | Bothwell et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0157251 A1 | 7/2007 | Shrivastava et al. |
| 2007/0166042 A1 | 7/2007 | Seeds et al. |
| 2007/0208961 A1 | 9/2007 | Ghoshal et al. |
| 2007/0224954 A1 | 9/2007 | Gopi |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0274279 A1 | 11/2007 | Wood et al. |
| 2007/0285239 A1 | 12/2007 | Easton et al. |
| 2007/0286599 A1 | 12/2007 | Sauer et al. |
| 2007/0297005 A1 | 12/2007 | Montierth et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0014992 A1 | 1/2008 | Pescod et al. |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0043784 A1 | 2/2008 | Wilcox |
| 2008/0044186 A1 | 2/2008 | George et al. |
| 2008/0056167 A1 | 3/2008 | Kim et al. |
| 2008/0058018 A1 | 3/2008 | Scheinert |
| 2008/0063387 A1 | 3/2008 | Yahata et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159226 A1 | 7/2008 | He et al. |
| 2008/0159744 A1 | 7/2008 | Soto et al. |
| 2008/0165720 A1 | 7/2008 | Hu et al. |
| 2008/0166094 A1 | 7/2008 | Bookbinder et al. |
| 2008/0168283 A1 | 7/2008 | Penning |
| 2008/0181282 A1 | 7/2008 | Wala et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |

(56) References Cited

U.S. PATENT DOCUMENTS

| | | |
|---|---|---|
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310848 A1 | 12/2008 | Yasuda et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0086693 A1 | 4/2009 | Kennedy |
| 2009/0087181 A1 | 4/2009 | Gray |
| 2009/0088072 A1 | 4/2009 | Rofougaran et al. |
| 2009/0092394 A1 | 4/2009 | Wei et al. |
| 2009/0097855 A1 | 4/2009 | Thelen et al. |
| 2009/0135078 A1 | 5/2009 | Lindmark et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Star et al. |
| 2009/0180407 A1 | 7/2009 | Sabat et al. |
| 2009/0180423 A1* | 7/2009 | Kroener .............. H04W 88/085 370/328 |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0221249 A1 | 9/2009 | Aue et al. |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0290632 A1 | 11/2009 | Wegener |
| 2009/0316609 A1 | 12/2009 | Singh |
| 2010/0002626 A1 | 1/2010 | Schmidt et al. |
| 2010/0002661 A1 | 1/2010 | Schmidt et al. |
| 2010/0009394 A1 | 1/2010 | Guo |
| 2010/0009694 A1 | 1/2010 | Fischer |
| 2010/0027443 A1 | 2/2010 | LoGalbo et al. |
| 2010/0054227 A1 | 3/2010 | Hettstedt et al. |
| 2010/0056200 A1 | 3/2010 | Tolonen |
| 2010/0067426 A1 | 3/2010 | Voschina et al. |
| 2010/0067906 A1 | 3/2010 | Adhikari et al. |
| 2010/0080154 A1 | 4/2010 | Noh et al. |
| 2010/0080182 A1 | 4/2010 | Kubler et al. |
| 2010/0083330 A1 | 4/2010 | Bernstein et al. |
| 2010/0087227 A1 | 4/2010 | Francos et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0144337 A1 | 6/2010 | Dean |
| 2010/0148373 A1 | 6/2010 | Chandrasekaran |
| 2010/0150034 A1 | 6/2010 | Song et al. |
| 2010/0156721 A1 | 6/2010 | Alamouti et al. |
| 2010/0177759 A1 | 7/2010 | Fischer et al. |
| 2010/0177760 A1 | 7/2010 | Cannon et al. |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0196013 A1 | 8/2010 | Franklin |
| 2010/0202326 A1 | 8/2010 | Rofougaran et al. |
| 2010/0202356 A1 | 8/2010 | Fischer et al. |
| 2010/0208777 A1 | 8/2010 | Ogaz |
| 2010/0215028 A1 | 8/2010 | Fischer |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0290787 A1 | 11/2010 | Cox |
| 2010/0291949 A1 | 11/2010 | Shapira et al. |
| 2010/0296458 A1 | 11/2010 | Wala et al. |
| 2010/0296816 A1 | 11/2010 | Larsen |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0316609 A1 | 12/2010 | Dewhurst et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0021146 A1 | 1/2011 | Pernu |
| 2011/0021224 A1 | 1/2011 | Koskinen et al. |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0069668 A1 | 3/2011 | Chion et al. |
| 2011/0070821 A1 | 3/2011 | Chun et al. |
| 2011/0071734 A1 | 3/2011 | Van Wiemeersch et al. |
| 2011/0086614 A1 | 4/2011 | Brisebois et al. |
| 2011/0105016 A1 | 5/2011 | Saito et al. |
| 2011/0116393 A1 | 5/2011 | Hong et al. |
| 2011/0116572 A1 | 5/2011 | Lee et al. |
| 2011/0126071 A1 | 5/2011 | Han et al. |
| 2011/0135308 A1 | 6/2011 | Tarlazzi et al. |
| 2011/0141895 A1 | 6/2011 | Zhang |
| 2011/0149879 A1 | 6/2011 | Noriega et al. |
| 2011/0158297 A1 | 6/2011 | Ding et al. |
| 2011/0158298 A1 | 6/2011 | Djadi et al. |
| 2011/0170577 A1 | 7/2011 | Anvari |
| 2011/0170619 A1 | 7/2011 | Anvari |
| 2011/0182230 A1 | 7/2011 | Ohm et al. |
| 2011/0182255 A1 | 7/2011 | Kim et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223959 A1 | 9/2011 | Chen |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0236024 A1 | 9/2011 | Mao |
| 2011/0237178 A1 | 9/2011 | Seki et al. |
| 2011/0241881 A1 | 10/2011 | Badinelli |
| 2011/0243201 A1 | 10/2011 | Phillips et al. |
| 2011/0243291 A1 | 10/2011 | McAllister et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2011/0316755 A1 | 12/2011 | Ayatollahi et al. |
| 2012/0106657 A1 | 5/2012 | Fischer et al. |
| 2012/0140690 A1 | 6/2012 | Choi et al. |
| 2012/0177026 A1* | 7/2012 | Uyehara .................. H04B 1/18 370/345 |
| 2012/0263098 A1 | 10/2012 | Takahashi et al. |
| 2012/0307719 A1 | 12/2012 | Nakasato |
| 2012/0314797 A1 | 12/2012 | Kummetz et al. |
| 2012/0314813 A1 | 12/2012 | Loyez et al. |
| 2012/0322477 A1 | 12/2012 | Kang et al. |

(56) References Cited

U.S. PATENT DOCUMENTS

| | | | |
|---|---|---|---|
| 2013/0012195 A1 | 1/2013 | Sabat, Jr. et al. |
| 2013/0017863 A1 | 1/2013 | Kummetz et al. |
| 2013/0040676 A1 | 2/2013 | Kang et al. |
| 2013/0089336 A1 | 4/2013 | Dahlfort et al. |
| 2013/0095870 A1 | 4/2013 | Phillips et al. |
| 2013/0114963 A1 | 5/2013 | Stapleton et al. |
| 2013/0150063 A1 | 6/2013 | Berlin et al. |
| 2013/0188753 A1 | 7/2013 | Tarlazzi et al. |
| 2013/0188959 A1 | 7/2013 | Cune et al. |
| 2013/0195467 A1 | 8/2013 | Schmid et al. |
| 2013/0210490 A1 | 8/2013 | Fischer et al. |
| 2013/0272202 A1 | 10/2013 | Stapleton et al. |
| 2013/0330086 A1 | 12/2013 | Berlin et al. |
| 2014/0016583 A1 | 1/2014 | Smith |
| 2014/0036770 A1 | 2/2014 | Stapleton et al. |
| 2014/0057627 A1 | 2/2014 | Hejazi et al. |
| 2014/0079112 A1 | 3/2014 | Ranson et al. |
| 2014/0105056 A1 | 4/2014 | Li et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0150063 A1 | 5/2014 | Bone |
| 2014/0204900 A1* | 7/2014 | Kawasaki ............. H04L 5/0005 370/330 |
| 2014/0219140 A1 | 8/2014 | Uyehara et al. |
| 2014/0241224 A1 | 8/2014 | Fischer et al. |
| 2014/0243033 A1 | 8/2014 | Wala et al. |
| 2014/0269318 A1 | 9/2014 | Hasarchi et al. |
| 2014/0269859 A1 | 9/2014 | Hanson et al. |
| 2014/0287677 A1 | 9/2014 | Machida |
| 2014/0308043 A1 | 10/2014 | Heidler et al. |
| 2014/0308044 A1 | 10/2014 | Heidler et al. |
| 2014/0314061 A1 | 10/2014 | Trajkovic et al. |
| 2015/0049663 A1 | 2/2015 | Mukherjee et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |
| 2015/0382292 A1 | 12/2015 | Heidler et al. |
| 2016/0080082 A1 | 3/2016 | Lemson et al. |
| 2016/0219591 A1 | 7/2016 | Lee et al. |
| 2017/0244541 A1 | 8/2017 | McAllister et al. |

FOREIGN PATENT DOCUMENTS

| | | |
|---|---|---|
| CA | 2065090 C | 2/1998 |
| CA | 2242707 C | 9/2002 |
| CN | 1745560 A | 3/2006 |
| CN | 101076961 A | 11/2007 |
| CN | 101090299 A | 12/2007 |
| CN | 101151811 A | 3/2008 |
| CN | 101296525 A | 10/2008 |
| CN | 101346006 A | 1/2009 |
| CN | 101496306 A | 7/2009 |
| CN | 101542928 A | 9/2009 |
| CN | 201315588 Y | 9/2009 |
| DE | 19705253 A1 | 8/1998 |
| DE | 20104862 U1 | 9/2001 |
| DE | 10249414 A1 | 5/2004 |
| EP | 0391597 A2 | 10/1990 |
| EP | 0461583 A1 | 12/1991 |
| EP | 0477952 A2 | 4/1992 |
| EP | 0477952 A3 | 4/1992 |
| EP | 0714218 A1 | 5/1996 |
| EP | 0766343 A2 | 4/1997 |
| EP | 0687400 B1 | 11/1998 |
| EP | 0993124 A2 | 4/2000 |
| EP | 1056226 A2 | 11/2000 |
| EP | 1173034 A1 | 1/2002 |
| EP | 1202475 A2 | 5/2002 |
| EP | 1227605 A2 | 7/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 A1 | 3/2005 |
| EP | 1530316 A1 | 5/2005 |
| EP | 1267447 B1 | 8/2006 |
| EP | 1693974 A1 | 8/2006 |
| EP | 1742388 A1 | 1/2007 |
| EP | 1173034 B1 | 7/2007 |
| EP | 1954019 A1 | 8/2008 |
| EP | 1968250 A1 | 9/2008 |
| EP | 1357683 B1 | 5/2009 |
| EP | 2110955 A1 | 10/2009 |
| EP | 2253980 A1 | 11/2010 |
| EP | 1570626 B1 | 11/2013 |
| GB | 2323252 A | 9/1998 |
| GB | 2366131 A | 2/2002 |
| GB | 2370170 A | 6/2002 |
| GB | 2399963 A | 9/2004 |
| GB | 2428149 A | 1/2007 |
| JP | 05260018 A | 10/1993 |
| JP | 08181661 A | 7/1996 |
| JP | 09083450 A | 3/1997 |
| JP | 09162810 A | 6/1997 |
| JP | 09200840 A | 7/1997 |
| JP | 11068675 A | 3/1999 |
| JP | 11088265 A | 3/1999 |
| JP | 2000152300 A | 5/2000 |
| JP | 2000341744 A | 12/2000 |
| JP | 2002264617 A | 9/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20040053467 A | 6/2004 |
| KR | 20110087949 A | 8/2011 |
| WO | 9603823 A1 | 2/1996 |
| WO | 9748197 A2 | 12/1997 |
| WO | 9935788 A2 | 7/1999 |
| WO | 0042721 A1 | 7/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A1 | 7/2005 |
| WO | 2005069203 A3 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2005117337 A1 | 12/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |

(56) References Cited

FOREIGN PATENT DOCUMENTS

| | | |
|---|---|---|
| WO | 2006077569 A1 | 7/2006 |
| WO | 2006094441 A1 | 9/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2009014710 A1 | 1/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2009145789 A1 | 12/2009 |
| WO | 2010087919 A2 | 8/2010 |
| WO | 2010090999 A1 | 8/2010 |
| WO | 2011043172 A1 | 4/2011 |
| WO | 2011112373 A1 | 9/2011 |
| WO | 2011139937 A1 | 11/2011 |
| WO | 2011139939 A1 | 11/2011 |
| WO | 2011139942 A1 | 11/2011 |
| WO | 2011160117 A1 | 12/2011 |
| WO | 2012024345 A2 | 2/2012 |
| WO | 2012051227 A1 | 4/2012 |
| WO | 2012051230 A1 | 4/2012 |
| WO | 2012054553 A1 | 4/2012 |
| WO | 2012058182 A1 | 5/2012 |
| WO | 2012100468 A1 | 8/2012 |
| WO | 2012170865 A2 | 12/2012 |
| WO | 2013009835 A1 | 1/2013 |
| WO | 2013063025 A1 | 5/2013 |
| WO | 2013122915 A1 | 8/2013 |
| WO | 2014022211 A2 | 2/2014 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Author Unknown, "Fiber Optic Distributed Antenna System," Installation and Users Guide, ERAU Version 1.5, May 2002, Andrews Corporation, 53 pages.

Notice of Allowance for U.S. Appl. No. 15/381,952, dated May 9, 2017, 7 pages.

Author Unknown, "ADC Has 3rd Generation Services Covered at CeBIT 2001," Business Wire, Mar. 20, 2001, 3 pages.

Author Unknown, "Andrew Unveils the InCell Fiber Optic Antenna System for In-Building Wireless Communications," Fiber Optics Weekly Update, Dec. 1, 2000, Information Gatekeepers Inc., pp. 3-4.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Fitzmaurice, M. et al., "Distributed Antenna System for Mass Transit Communications," Vehicular Technology Conference, Boston, Massachusetts, Sep. 2000, IEEE, pp. 2011-2018.

Ghafouri-Shiraz, et al., "Radio on Fibre Communication Systems Based on Integrated Circuit-Antenna Modules," Microwave and Millimeter Wave Technology Proceedings, Beijing, China, Aug. 1998, IEEE, pp. 159-169.

Griffin, R.A. et al., "Radio-Over-Fiber Distribution Using an Optical Millimeter-Wave/DWDM Overlay," Optical Fiber Communication Conference, San Diego, California, Feb. 1999, IEEE, pp. 70-72.

Juntunen, J. et al., "Antenna Diversity Array Design for Mobile Communication Systems," Proceedings of the 2000 IEEE International Conference on Phased Array Systems and Technology, Dana Point, California, May 2000, IEEE, pp. 65-67.

Lee, D. et al., "Ricocheting Bluetooth," 2nd International Conference on Microwave and Millimeter Wave Technology Proceedings, Beijing, China, Sep. 2000, IEEE, pp. 432-435.

Lee, T., "A Digital Multiplexed Fiber Optic Transmission System for Analog Audio Signals," IEEE Western Canada Conference on Computer, Power, and Communications Systems in a Rural Environment, Regina, Saskatchewan, May 1991, pp. 146-149.

Schuh et al., "Hybrid Fibre Radio Access: A Network Operators Approach and Requirements," Proceedings of the 10th Microcoll Conference, Mar. 21-24, 1999, Budapest, Hungary, pp. 211-214.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Margotte, B. et al., "Fibre Optic Distributed Antenna System for Cellular and PCN/PCS Indoor Coverage," Microwave Engineering Europe, Jun. 1998, 6 pages.

Matsunaka et al., "Point-to-multipoint Digital Local Distribution Radio System in the 21 GHz Band," KDD Technical Journal, Mar. 1991, No. 145, p. 43-54.

Translation of the First Office Action for Chinese patent application 201180039569.3 dated Jan. 16, 2015, 7 pages.

International Search Report for PCT/US2012/025337 dated May 16, 2012, 4 pages.

Non-final Office Action for U.S. Appl. No. 13/025,719 dated Mar. 31, 2015, 26 pages.

Non-final Office Action for U.S. Appl. No. 13/967,426 dated Dec. 26, 2014, 15 pages.

Cooper, A.J., "Fibre/Radio for the Provision of Cordless/Mobile Telephony Services in the Access Network," Electronics Letters, 1990, pp. 2054-2056, vol. 26, No. 24.

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12.

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.

International Search Report for PCT/US07/21041 dated Mar. 7, 2008, 3 pages.

No Author, "ITU-T G.652, Telecommunication Standardization Sector of ITU, Series G: Transmission Systems and Media, Digital Systems and Networks, Transmission Media Characteristics—Optical Fibre Cables, Characteristics of a Single-Mode Optical Fiber and Cable," ITU-T Recommendation G.652, International Telecommunication Union, Jun. 2005, 20 pages.

No Author, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 19 pages.

Kojucharow, K., et al., "Millimeter-Wave Signal Properties Resulting from Electrooptical Upconversion," IEEE Transactions on Microwave Theory and Techniques, Oct. 2001, vol. 49, No. 10, pp. 1977-1985.

Monro, T.M., et al., "Holey Fibers with Random Cladding Distributions," Optics Letters, Feb. 15, 2000, vol. 25, No. 4, pp. 206-208.

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

(56) References Cited

OTHER PUBLICATIONS

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2002, pp. 271-282.
Author Unknown, RFID Technology Overview, Date Unknown, 11 pages.
Roh, W., et al., "MIMO Channel Capacity for the Distributed Antenna Systems," Proceedings of the 56th IEEE Vehicular Technology Conference, Sep. 2002, vol. 2, pp. 706-709.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept in Wireless Network Infrastructure," Electronics Letters, Feb. 27, 1997, vol. 33, No. 5, pp. 404-406.
Winters, J., et al., "The Impact of Antenna Diversity on the Capacity of Wireless Communication Systems," IEEE Transactions on Communications, vol. 42, No. 2/3/4, Feb./Mar./Apr. 1994, pp. 1740-1751.
Opatic, D., "Radio over Fiber Technology for Wireless Access," Ericsson, Oct. 17, 2009, 6 pages.
Examination Report for European Patent Application No. 11721160.7, dated Sep. 25, 2017, 7 pages.
Translation of the First Office Action for Chinese Patent Application No. 201610029179.2, dated Jul. 27, 2017, 19 pages.
Advisory Action for U.S. Appl. No. 14/664,305, dated Oct. 30, 2017, 3 pages.
Notice of Allowance for U.S. Appl. No. 14/664,305, dated Dec. 1, 2017, 19 pages.
Non-Final Office Action for U.S. Appl. No. 15/473,827, dated Sep. 22, 2017, 38 pages.
Final Office Action for U.S. Appl. No. 14/664,305, dated Sep. 5, 2017, 34 pages.
Examiner's Answer to the Appeal Brief for U.S. Appl. No. 15/049,913, dated Jun. 22, 2017, 22 pages.
Notice of Allowance for U.S. Appl. No. 15/381,952, dated Jul. 31, 2017, 7 pages.
Notice of Allowance for U.S. Appl. No. 15/332,505, dated Aug. 31, 2017, 8 pages.
Final Office Action for U.S. Appl. No. 14/711,306 dated Jul. 9, 2015, 16 pages.
Advisory Action for U.S. Appl. No. 13/967,426 dated Jul. 6, 2015, 3 pages.
Examination Report for European patent application 11721160.7 dated Oct. 21, 2015, 7 pages.
Translation of the Second Office Action for Chinese patent application 201180024499.4 dated Aug. 17, 2015, 3 pages.
Advisory Action for U.S. Appl. No. 14/711,306 dated Oct. 8, 2015, 3 pages.
Non-final Office Action for U.S. Appl. No. 13/967,426 dated Sep. 17, 2015, 27 pages.
Mohammed, Maalim, et al., "New Compact Design of Dual Notched Bands UWB Antenna with Slots in Radiating and Feeding Elements," IEEE Student Conference on Research and Development, Dec. 16-17, 2013, Putrajaya, Malaysia, IEEE, pp. 374-379.
International Search Report and Written Opinion for PCT/IL2015/051205 dated Mar. 10, 2016, 14 pages.
International Search Report for PCT/IL2015/051219 dated Mar. 17, 2016, 5 pages.
International Search Report and Written Opinion for PCT/IL2015/051217 dated Mar. 17, 2016, 14 pages.
International Search Report and Written Opinion for PCT/IL2015/051095 dated Mar. 2, 2016, 14 pages.
International Search Report and Written Opinion for PCT/IL2015/051061 dated Feb. 15, 2016, 12 pages.
Notice of Allowance for U.S. Appl. No. 13/025,719 dated Aug. 11, 2016, 8 pages.
Non-final Office Action for U.S. Appl. No. 14/664,305 dated Jul. 7, 2016, 45 pages.
Final Office Action for U.S. Appl. No. 14/664,305, dated Dec. 23, 2016, 24 pages.
Non-final Office Action for U.S. Appl. No. 15/049,913 dated Jun. 16, 2016, 20 pages.
Final Office Action for U.S. Appl. No. 15/049,913, dated Nov. 25, 2016, 16 pages.
Notice of Allowance and Examiner-Initiated Interview Summary for U.S. Appl. No. 15/098,941, dated Jul. 14, 2016, 18 pages.
Corrected Notice of Allowability for U.S. Appl. No. 15/098,941, dated Jul. 27, 2016, 5 pages.
Advisory Action for U.S. Appl. No. 15/049,913, dated Feb. 15, 2017, 3 pages.
Non-Final Office Action for U.S. Appl. No. 15/381,952, dated Jan. 27, 2017, 14 pages.
International Search Report for PCT/IL2015/050970, dated May 9, 2016, 6 pages.
International Preliminary Report on Patentability for PCT/IL2015/050970, dated Apr. 6, 2017, 17 pages.
Non-Final Office Action for U.S. Appl. No. 14/496,507, dated Feb. 24, 2017, 15 pages.
Advisory Action for U.S. Appl. No. 14/664,305, dated Mar. 1, 2017, 3 pages.
Non-Final Office Action for U.S. Appl. No. 14/664,305, dated Apr. 7, 2017, 34 pages.
Non-Final Office Action for U.S. Appl. No. 15/332,505, dated Apr. 5, 2017, 24 pages.
Notification of Grant for Chinese patent application 201190000473.1 dated Aug. 28, 2013, 4 pages.
International Search Report for PCT/US2011/034725 dated Aug. 5, 2011, 4 pages.
Non-final Office Action for U.S. Appl. No. 12/892,424 dated Nov. 5, 2012, 22 pages.
International Search Report and Written Opinion for PCT/US2011/034738 dated Jul. 27, 2011, 13 pages.
International Search Report for PCT/US2011/047821 dated Oct. 25, 2011, 4 pages.
International Preliminary Report on Patentability for PCT/US2011/047821 dated Feb. 19, 2013, 10 pages.
Non-final Office Action for U.S. Appl. No. 13/025,719 dated Sep. 11, 2013, 18 pages.
Parker et al., "Radio-over-fibre technologies arising from the Building the future Optical Network in Europe (BONE) project," Optoelectron., 2010, vol. 4, Issue 6, pp. 247-259.
Singh et al., "Distributed coordination with deaf neighbors: efficient medium access for 60 GHz mesh networks," IEEE INFOCOM 2010 proceedings, 9 pages.
Examination Report for European patent application 11754570.7 dated Nov. 18, 2013, 7 pages.
Final Office Action for U.S. Appl. No. 13/025,719 dated Dec. 31, 2013, 20 pages.
Advisory Action for U.S. Appl. No. 13/025,719 dated Mar. 14, 2014, 6 pages.
Non-final Office Action for U.S. Appl. No. 13/785,603 dated Dec. 23, 2013, 15 pages.
Final Office Action for U.S. Appl. No. 13/785,603 dated Apr. 14, 2014, 17 pages.
Advisory Action for U.S. Appl. No. 13/785,603 dated Jun. 30, 2014, 3 pages.
Non-final Office Action for U.S. Appl. No. 13/785,603 dated Sep. 9, 2014, 10 pages.
Final Office Action for U.S. Appl. No. 13/785,603 dated Dec. 4, 2014, 8 pages.

(56) References Cited

OTHER PUBLICATIONS

Non-final Office Action for U.S. Appl. No. 13/762,432 dated Aug. 20, 2014, 4 pages.
Notice of Allowance for U.S. Appl. No. 13/762,432 dated Dec. 24, 2014, 7 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
International Search Report for PCT/US2011/055861 dated Feb. 7, 2012, 4 pages.
International Preliminary Report on Patentability for PCT/US2011/055861 dated Apr. 25, 2013, 9 pages.
International Search Report for PCT/US2011/055858 dated Feb. 7, 2012, 4 pages.
International Preliminary Report on Patentability for PCT/US2011/055858 dated Apr. 25, 2013, 8 pages.
International Search Report for PCT/US2011/034733 dated Aug. 1, 2011, 5 pages.
International Preliminary Report on Patentability for PCT/US2011/034733 dated Nov. 15, 2012, 8 pages.
First Office Action for Chinese patent application 201180024499.4 dated Dec. 1, 2014, 13 pages.
Examination Report for European patent application 11754570.7 dated Jan. 13, 2015, 5 pages.
Final Office Action for U.S. Appl. No. 13/967,426 dated Apr. 29, 2015, 22 pages.

* cited by examiner

SUPPORTING ANALOG REMOTE ANTENNA UNITS (RAUS) IN DIGITAL DISTRIBUTED ANTENNA SYSTEMS (DASS) USING ANALOG RAU DIGITAL ADAPTORS

BACKGROUND

The disclosure relates generally to distribution of communications signals in a distributed antenna system (DAS), and more particularly to supporting analog remote antenna units (RAUs) in digital DASs using analog RAU digital adaptors.

Wireless customers are increasingly demanding digital data services, such as streaming video signals. Concurrently, some wireless customers use their wireless devices in areas that are poorly served by conventional cellular networks, such as inside certain buildings or areas where there is little cellular coverage. One response to the intersection of these two concerns has been the use of DASs. DASs can be particularly useful when deployed inside buildings or other indoor environments where client devices may not otherwise be able to effectively receive radio frequency (RF) signals from a source. DASs include RAUs configured to receive and transmit communications signals to client devices within the antenna range of the RAUs.

A typical DAS comprises head-end equipment (HEE) communicatively coupled to a plurality of RAUs. The HEE connects to a variety of wireless services, such as wideband code division multiple access (WCDMA), long term evolution (LTE), and wireless local area network (WLAN) communications services. To distribute such wireless communications services in a DAS, the wireless communications services can be provided in the form of analog RF communications signals and/or digital communications signals to the HEE of the DAS.

The RAUs are typically chosen and deployed based a variety of factors, such as wireless communications services, RF spectrums, regulatory requirements, operating environments, and costs. The DASs may be configured to receive and distribute communications signals in either analog or digital forms. Analog communications signals may be directly modulated onto a carrier signal for transmissions over a communications medium. The DASs configured to directly provide analog communications signals to the RAUs are therefore known as analog DASs and the RAUs are known as analog RAUs. Digital communications signals, in contrast, are signals generated by sampling and digitizing an analog communications signal before modulating onto the carrier signal. The DASs configured to directly provide digital communications signals to the RAUs are therefore known as digital DASs and the RAUs are known as digital RAUs. Although digital RAUs can have advantages over analog RAUs, digital RAUs can be more expensive than analog RAUs due to the additional expense of digital signal processing components.

No admission is made that any reference cited herein constitutes prior art. Applicant expressly reserves the right to challenge the accuracy and pertinency of any cited documents.

SUMMARY

One embodiment of the disclosure relates to supporting analog remote antenna units (RAUs) in digital distributed antenna systems (DASs) using analog RAU digital adaptors. In a digital DAS disclosed herein, head-end equipment (HEE) is communicatively coupled to a plurality of digital RAUs and configured to exchange digital communications signals with the plurality of digital RAUs over an uplink and downlink communications medium. The digital DAS is also configured to distribute digital communications signals to an analog RAU(s), which is not inherently capable of processing the digital communications signals. In this regard, an analog RAU digital adaptor(s) is provided in an analog remote unit to serve as a digital interface for the analog RAU(s). The analog RAU digital adaptor(s) is communicatively coupled to the analog RAU(s) over a pair of uplink and downlink optical fibers. The analog RAU digital adaptor(s) is also coupled to the digital DAS over the uplink and downlink communications medium. The analog RAU digital adaptor(s) is configured to enable communications between the digital DAS and the analog RAU(s) by providing conversions between the digital communications signals and analog radio frequency (RF) communications signals. The analog RAU(s) is typically less expensive than a digital RAU(s). Furthermore, some client devices may not be configured to communicate with the digital RAU(s) directly, thus preventing these client devices from interfacing with the digital DAS. By providing the analog RAU digital adaptor(s) as the digital interface for the analog RAU(s), the digital DAS can be configured to compatibly communicate with both the analog RAU(s) and the digital RAU(s), thus helping to reduce costs and improve backward compatibility.

An additional embodiment of the disclosure relates to an adaptive analog remote unit for a digital DAS. The adaptive analog remote unit comprises at least one analog RAU. The at least one analog RAU is configured to receive at least one uplink analog RF communications signal from at least one client device. The at least one analog RAU is also configured to convert the at least one uplink analog RF communications signal into at least one uplink analog optical communications signal. The adaptive analog remote unit also comprises at least one analog RAU digital adaptor coupled to the at least one analog RAU over at least one uplink optical fiber. The at least one analog RAU is configured to provide the at least one uplink analog optical communications signal to the at least one analog RAU digital adaptor. The at least one analog RAU digital adaptor is configured to receive the at least one uplink analog optical communications signal from the at least one analog RAU over the at least one uplink optical fiber. The at least one analog RAU digital adaptor is also configured to convert the at least one uplink analog optical communications signal into at least one uplink digital communications signal. The at least one analog RAU digital adaptor is also configured to distribute the at least one uplink digital communications signal over at least one uplink communications medium to a digital HEE in the digital DAS.

An additional embodiment of the disclosure relates to a method for supporting an analog RAU in a digital DAS. The method comprises receiving at least one uplink analog RF communications signal by at least one analog RAU from a plurality of client devices. The method also comprises converting the at least one uplink analog RF communications signal into at least one uplink analog optical communications signal to be provided to at least one analog RAU digital adaptor over at least one uplink optical fiber. The method also comprises receiving the at least one uplink analog optical communications signal by the at least one analog RAU digital adaptor. The method also comprises converting the at least one uplink analog optical communications signal back into the at least one uplink analog RF communications signal. The method also comprises converting the at least one uplink analog RF communications signal into at least one uplink digital communications signal to be distributed in the digital DAS, wherein the at least one uplink digital communications signal carries formatted uplink data packets.

An additional embodiment of the disclosure relates to a digital DAS. The digital DAS comprises a digital HEE configured to communicate with at least one communications signal source. The digital DAS also comprises at least one digital remote unit comprising at least one digital RAU coupled to the digital HEE over at least one first uplink communications medium and at least one first downlink communications medium. The digital DAS also comprises at least one adaptive analog remote unit. The at least one adaptive analog remote unit comprises at least one analog RAU digital adaptor coupled to the digital HEE over at least one second uplink communications medium and at least one second downlink communications medium. The at least one adaptive analog remote unit also comprises at least one analog RAU coupled to the at least one analog RAU digital adaptor over at least one uplink transmission medium and at least one downlink transmission medium.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

One embodiment of the disclosure relates to supporting analog remote antenna units (RAUs) in digital distributed antenna systems (DASs) using analog RAU digital adaptors. In a digital DAS disclosed herein, head-end equipment (HEE) is communicatively coupled to a plurality of digital RAUs and configured to exchange digital communications signals with the plurality of digital RAUs over an uplink and downlink communications medium. The digital DAS is also configured to distribute digital communications signals to an analog RAU(s), which is not inherently capable of processing the digital communications signals. In this regard, an analog RAU digital adaptor(s) is provided in an analog remote unit to serve as a digital interface for the analog RAU(s). The analog RAU digital adaptor(s) is communicatively coupled to the analog RAU(s) over a pair of uplink and downlink optical fibers. The analog RAU digital adaptor(s) is also coupled to the digital DAS over the uplink and downlink communications medium. The analog RAU digital adaptor(s) is configured to enable communications between the digital DAS and the analog RAU(s) by providing conversions between the digital communications signals and analog radio frequency (RF) communications signals. The analog RAU(s) is typically less expensive than a digital RAU(s). Furthermore, some client devices may not be configured to communicate with the digital RAU(s) directly, thus preventing these client devices from interfacing with the digital DAS. By providing the analog RAU digital adaptor(s) as the digital interface for the analog RAU(s), the digital DAS can be configured to compatibly communicate with both the analog RAU(s) and the digital RAU(s), thus helping to reduce costs and improve backward compatibility.

Figure 1:
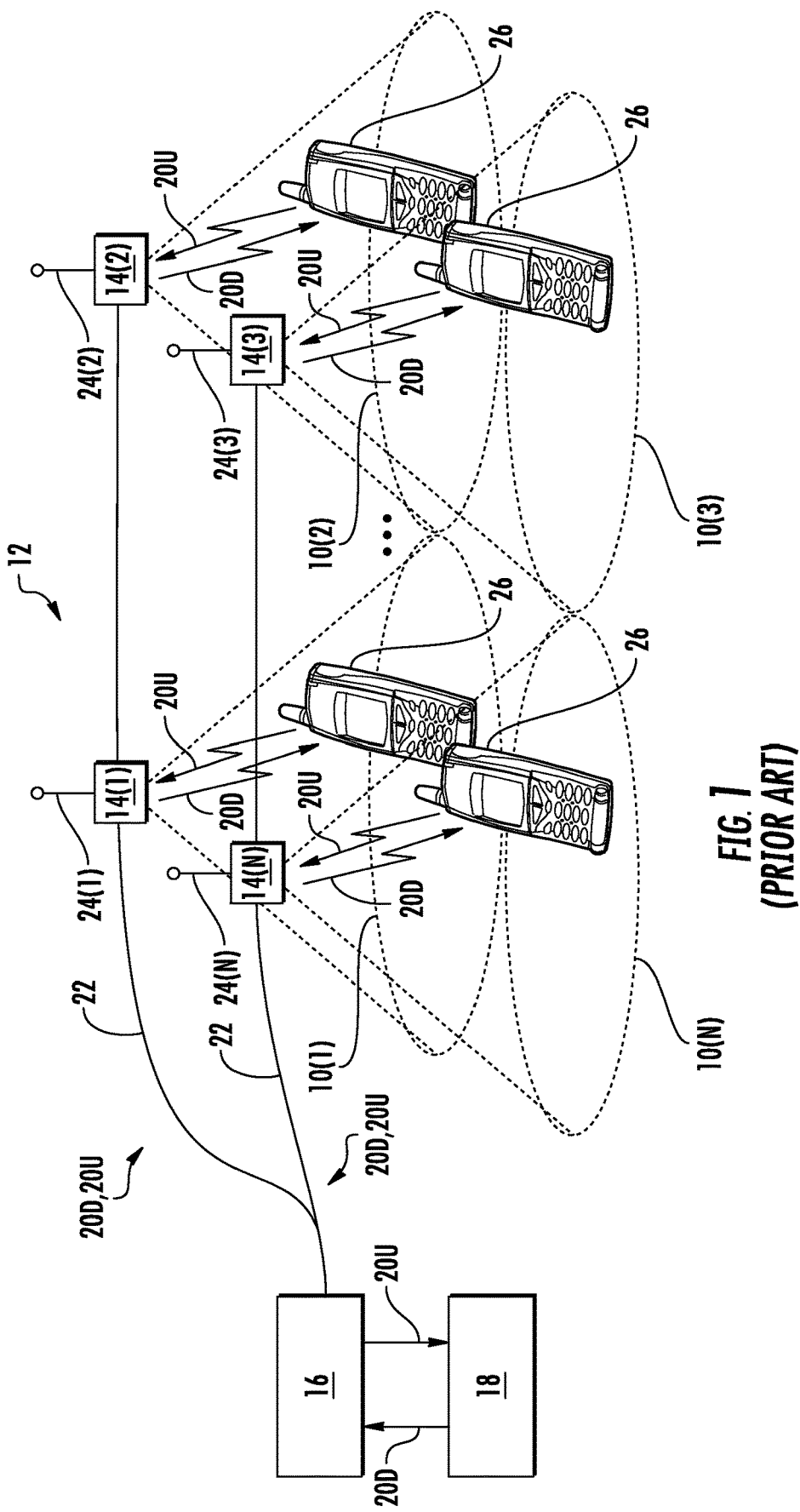
FIG. 1 is a schematic diagram of an exemplary digital distributed antenna system (DAS)
Figure 2:
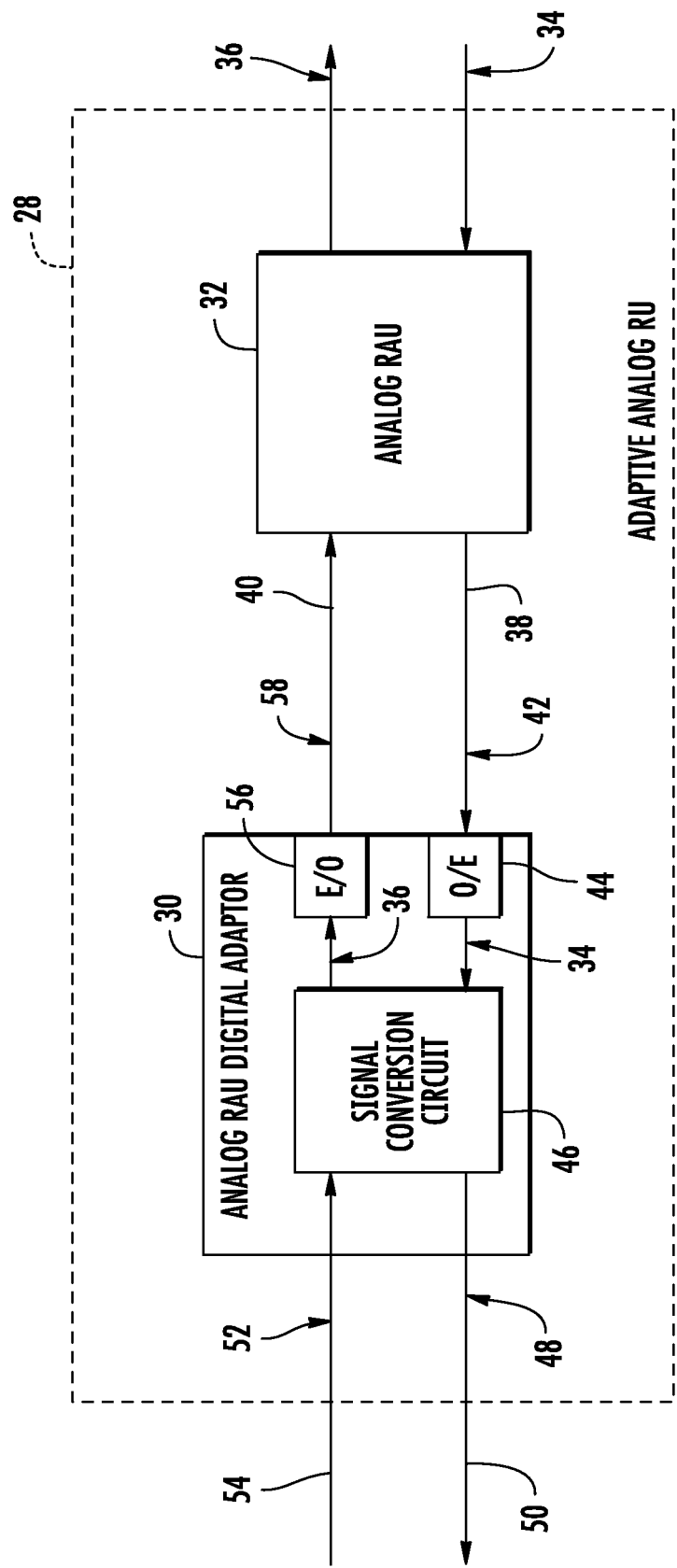
FIG. 2 is a schematic diagram of an exemplary adaptive analog remote unit having an analog remote antenna unit (RAU) digital adaptor configured to interface an analog RAU with the digital DAS of FIG. 1 by providing conversions between digital radio frequency (RF) communications signals and analog RF communications signals.

Before discussing examples of compatibly supporting an analog RAU in a digital DAS starting at FIG. 2, a discussion of an exemplary digital DAS that employs a communications medium to support wireless communications services to a plurality of digital remote units is first provided with reference to FIG. 1. The discussion of specific exemplary aspects of compatibly supporting an adaptive analog remote unit and a digital remote unit in a digital DAS starts at FIG. 2.

Analog signals and digital signals are the two types of communications signals used in modern communications systems like DASs. An analog signal is a continuous signal, such as a sine wave, that is configured to use a continuous range of values to represent information. A digital signal, in contrast, is a discrete time signal generated by sampling and digitizing an analog signal. The analog signal and the digital signal may be modulated onto a RF carrier to generate an analog RF signal and a digital RF signal, respectively, for transmissions over a wireless communications medium. Similarly, the analog signal and the digital signal may also be modulated onto an optical carrier to generate an analog optical signal and a digital optical signal, respectively, for transmissions over an optical fiber-based communications medium. Furthermore, the digital signal may be transmitted without being modulated onto a carrier signal, wherein the digital signal is known as a digital baseband signal. Analog signals can only be processed by analog components; a DAS made of such analog components is thus known as an analog DAS. Likewise, digital signals can only be processed by digital components; a DAS made of such digital components is thus known as a digital DAS.

In this regard, FIG. 1 illustrates distribution of communications services to coverage areas 10(1)-10(N) of a digital DAS 12, wherein 'N' is the number of coverage areas. These communications services can include cellular services, wireless services such as RF identification (RFID) tracking, Wireless Fidelity (Wi-Fi), local area network (LAN), WLAN, and combinations thereof, as examples. The coverage areas 10(1)-10(N) may be remotely located. In this regard, the remote coverage areas 10(1)-10(N) are created by and centered on digital RAUs 14(1)-14(N) connected to a digital HEE 16 (e.g., a head-end controller or head-end unit or central unit). The digital HEE 16 may be communicatively coupled to a signal source 18, for example a base transceiver station (BTS) or a baseband unit (BBU). In this regard, the digital HEE 16 receives downlink digital RF communications signals 20D from the signal source 18 to be distributed to the digital RAUs 14(1)-14(N). The digital RAUs 14(1)-14(N) are configured to receive the downlink digital RF communications signals 20D from the digital HEE 16 over a communications medium 22 to be distributed to the respective coverage areas 10(1)-10(N) of the digital RAUs 14(1)-14(N). In a non-limiting example, the communications medium 22 may be a wired communications medium, a wireless communications medium, or an optical fiber-based communications medium. Each of the digital RAUs 14(1)-14(N) may include a RF transmitter/receiver (not shown) and a respective antenna 24(1)-24(N) operably connected to the RF transmitter/receiver to wirelessly distribute the communications services to client devices 26 within their respective remote coverage areas 10(1)-10(N). The digital RAUs 14(1)-14(N) are also configured to receive uplink digital RF communications signals 20U from the client devices 26 in their respective remote coverage areas 10(1)-10(N) to be distributed to the signal source 18. The size of a given remote coverage area 10(1)-10(N) is determined by the amount of RF power transmitted by the respective digital RAU 14(1)-14(N), the receiver sensitivity, antenna gain and the RF environment, as well as by the RF transmitter/receiver sensitivity of the client device 26. Client devices 26 usually have a fixed maximum RF receiver sensitivity, so that the above-mentioned properties of the digital RAUs 14(1)-14(N) mainly determine the size of their respective remote coverage areas 10(1)-10(N).

With reference to the digital DAS 12 of FIG. 1, the downlink digital RF communications signal 20D and the uplink digital RF communications signal 20U can be directly distributed between the digital HEE 16 and the digital RAUs 14(1)-14(N) over the communications medium 22. In some cases, it may be desirable to also support analog RAUs in the digital DAS 12 in an effort to reduce system cost and provide backward compatibility (e.g., supporting client devices only capable of communicating with analog RAUs). However, the analog RAUs are inherently incapable of processing the downlink digital RF communications signal 20D and the uplink digital RF communications signal 20U. In this regard, FIG. 2 is a schematic diagram of an exemplary adaptive analog remote unit 28 having an analog RAU digital adaptor 30 configured to interface an analog RAU 32 with the digital DAS 12 (shown in FIG. 1) by providing conversions between the digital RF communications signals and the analog RF communications signals. Elements of FIG. 1 are referenced in connection to FIG. 2 and will not be re-described herein.

The analog RAU 32 is configured to communicate an uplink analog RF communications signal 34 and a downlink analog RF communications signal 36 to a plurality of client devices (not shown). The analog RAU 32 is coupled to the analog RAU digital adaptor 30 over an uplink optical fiber 38 and a downlink optical fiber 40. Although the analog RAU digital adaptor 30 and the analog RAU 32 are coupled by the uplink optical fiber 38 and the downlink optical fiber 40, the communications medium between the analog RAU digital adaptor 30 and the analog RAU 32 is not limited to optical fibers. In fact, the analog RAU digital adaptor 30 and the analog RAU 32 may be coupled by a variety of uplink transmission medium and downlink transmission medium. In a non-limiting example, the uplink transmission medium and the downlink transmission medium may include wired transmission medium and wireless transmission medium as well. Upon receiving the uplink analog RF communications signal 34, the analog RAU 32 converts the uplink analog RF communications signal 34 into an uplink analog optical communications signal 42 to be provided to a first optical-to-electrical (O/E) converter 44 in the analog RAU digital adaptor 30 over the uplink optical fiber 38. The O/E converter 44, in turn, converts the uplink analog optical communications signal 42 back into the uplink analog RF communications signal 34. A signal conversion circuit 46 in the analog RAU digital adaptor 30 receives and converts the uplink analog RF communications signal 34 into an uplink digital communications signal 48 to be provided to the digital HEE 16 (shown in FIG. 1) in the digital DAS 12 (shown in FIG. 1) over an uplink communications medium 50.

The signal conversion circuit 46 in the analog RAU digital adaptor 30 is also configured to receive a downlink digital communications signal 52 from the digital HEE 16 (shown in FIG. 1) in the digital DAS 12 (shown in FIG. 1) over a downlink communications medium 54. The signal conversion circuit 46 converts the downlink digital communications signal 52 into the downlink analog RF communications signal 36. A first electrical-to-optical (E/O) converter 56 in the analog RAU digital adaptor 30 receives and converts the downlink analog RF communications signal 36 into a downlink analog optical communications signal 58 to be provided to the analog RAU 32 over the downlink optical fiber 40. The analog RAU 32, in turn, converts the downlink analog optical communications signal 58 back into the downlink analog RF communications signal 36 to be provided to the plurality of client devices (not shown). In a non-limiting example, the analog RAU digital adaptor 30 and the analog RAU 32 may be collocated inside an enclosure of the adaptive analog remote unit 28. In another non-limiting example, the analog RAU digital adaptor 30 may be provided as a software function, a hardware element, or a combination of both. By providing the analog RAU digital adaptor 30 in the adaptive analog remote unit 28, the digital DAS 12 (not shown) can be configured to support the analog RAU 32 in the same way as supporting the digital RAUs 14(1)-14(N) (not shown).

Figure 3:
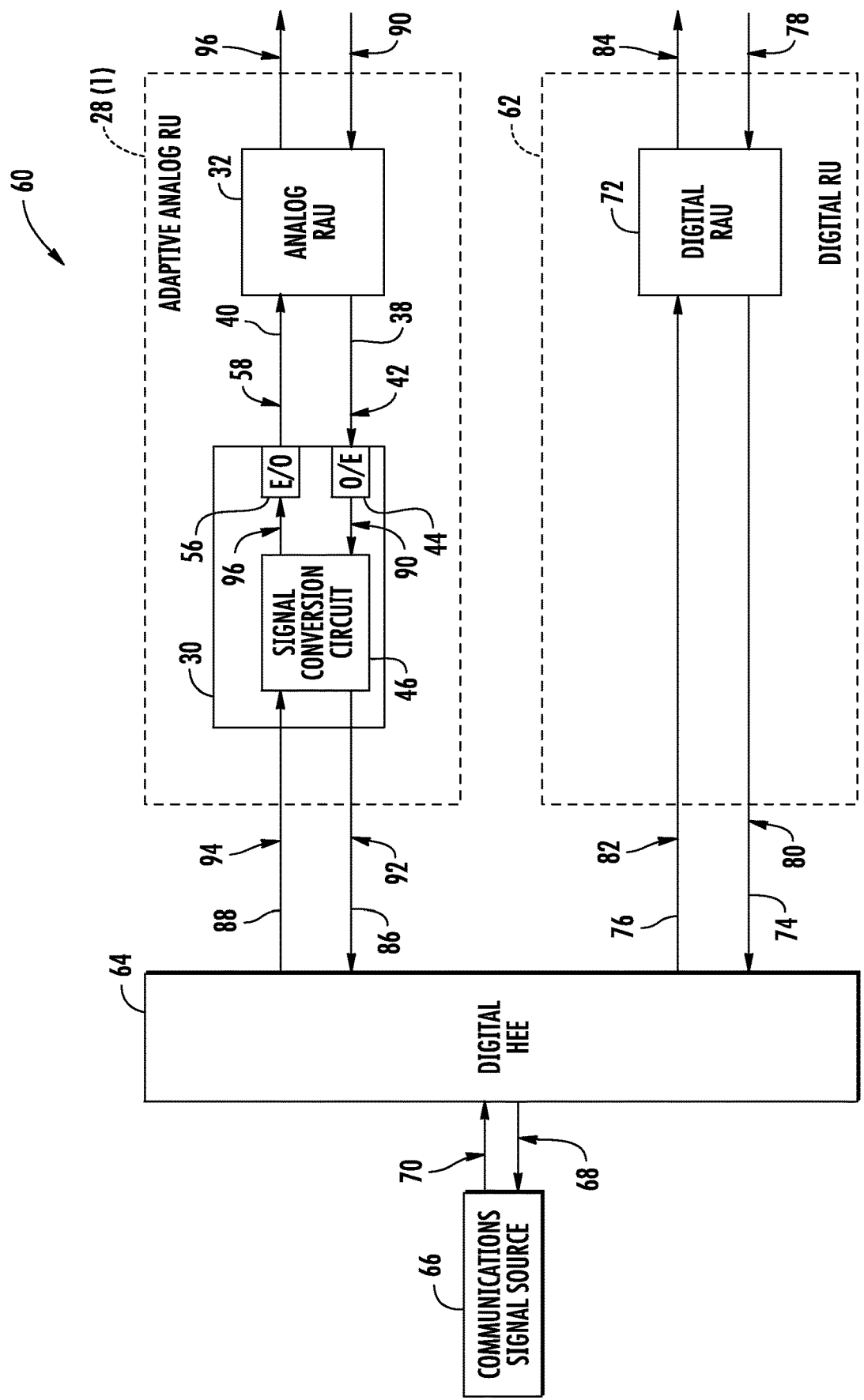
FIG. 3 is a schematic diagram of an exemplary digital DAS configured to compatibly support at least one digital remote unit and at least one analog remote unit by incorporating the analog RAU digital adaptor in FIG. 2 to provide conversions between analog RF communications signals and digital communications signals.

In this regard, FIG. 3 is a schematic diagram of an exemplary digital DAS 60 configured to compatibly support at least one digital remote unit 62 and the analog RAU 32 by incorporating the analog RAU digital adaptor 30 in FIG. 2. The analog RAU digital adaptor 30 is configured to provide conversions between the analog RF communications signals and the digital communications signals. Common elements between FIG. 2 and FIG. 3 are shown therein with common element numbers, thus will not be re-described herein. The digital DAS 60 comprises a digital HEE 64. The digital HEE 64 is communicatively coupled to at least one communications signal source 66 to communicate at least one uplink communications signal 68 and at least one downlink communications signal 70. In a non-limiting example, the uplink communications signal 68 and the downlink communications signal 70 may be digital RF communications signals or digital baseband communications signals.

The digital remote unit 62 comprises at least one digital RAU 72. The digital RAU 72 is coupled to the digital HEE 64 over at least one first uplink communications medium 74 and at least one first downlink communications medium 76. In a non-limiting example, the first uplink communications medium 74 and the first downlink communications medium 76 may be optical fiber-based communications mediums, wired communications mediums, or wireless communications mediums. Upon receiving at least one uplink digital RF communications signal 78 from a plurality of first client devices (not shown), the digital RAU 72 converts the uplink digital RF communications signal 78 into at least one first uplink digital communications signal 80 to be provided to the digital HEE 64 over the first uplink communications medium 74. The digital HEE 64 converts the first uplink digital communications signal 80 into the uplink communications signal 68, which is in an appropriate form for transmission to the communications signal source 66. In a non-limiting example, the communications signal source 66 may be a BTS and the uplink communications signal 68 is the uplink digital RF communications signal 78. In another non-limiting example, the communications signal source 66 may be a BBU and the uplink communications signal 68 is a digital baseband communications signal converted from the uplink digital RF communications signal 78.

The digital HEE 64 is configured to receive the downlink communications signal 70 from the communications signal source 66. Upon receiving the downlink communications signal 70 destined to the digital remote unit 62, the digital HEE 64 converts the downlink communications signal 70 into at least one first downlink digital communications signal 82 to be provided to the digital RAU 72 in the digital remote unit 62 over the first downlink communications medium 76. The digital RAU 72 in turn converts the first downlink digital communications signal 82 into at least one downlink digital RF communications signal 84 to be provided to the plurality of first client devices (not shown). In a non-limiting example, the communications signal source 66 may be a BTS and the downlink communications signal 70 is the downlink digital RF communications signal 84. In another non-limiting example, the communications signal source 66 may be a BBU and the downlink communications signal 70 is a digital baseband communications signal.

With continuing reference to FIG. 3, the adaptive analog remote unit 28(1) comprises the analog RAU digital adaptor 30 and the analog RAU 32. The signal conversion circuit 46 is coupled to the digital HEE 64 over at least one second uplink communications medium 86 and at least one second downlink communications medium 88. In a non-limiting example, the second uplink communications medium 86 and the second downlink communications medium 88 may be optical fiber-based communications mediums, wired communications mediums, or wireless communications mediums. At least one uplink analog RF communications signal 90 is received by the analog RAU 32 from a plurality of second client devices (not shown). The uplink analog RF communications signal 90 is subsequently converted into at least one second uplink digital communications signal 92 by the signal conversion circuit 46 as previously described in reference to FIG. 2. The analog RAU digital adaptor 30 then provides the second uplink digital communications signal 92 to the digital HEE 64 over the second uplink communications medium 86.

With continuing reference to FIG. 3, upon receiving the downlink communications signal 70 destined for the adaptive analog remote unit 28(1), the digital HEE 64 converts the downlink communications signal 70 into at least one second downlink digital communications signal 94 to be provided to the signal conversion circuit 46 in the analog RAU digital adaptor 30 over the second downlink communications medium 88. The signal conversion circuit 46 in turn converts the second downlink digital communications signal 94 into at least one downlink analog RF communications signal 96, which is subsequently provided to the plurality of second client devices (not shown) by the analog RAU 32 as previously discussed in FIG. 2.

Figure 4:
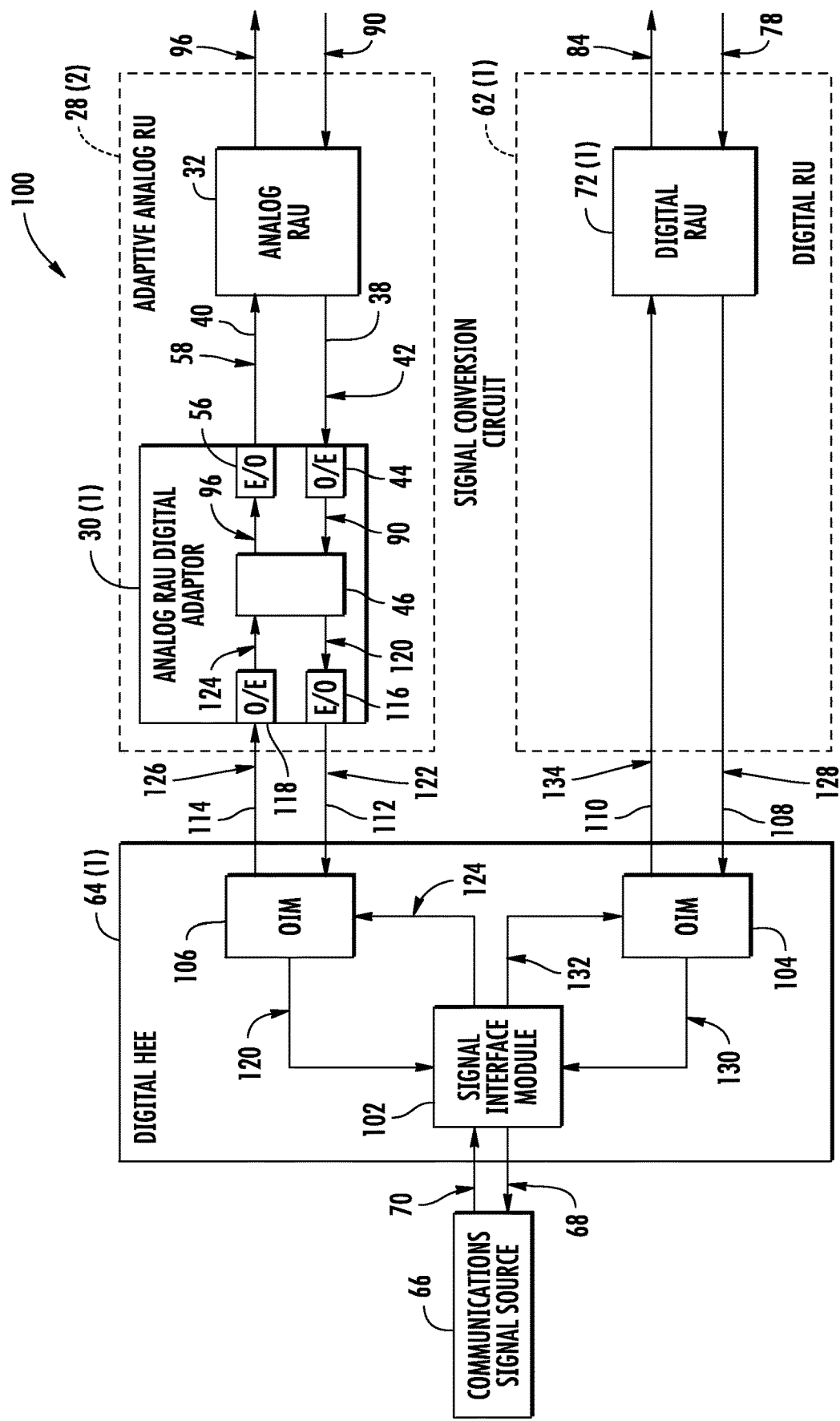
FIG. 4 is a schematic diagram of an exemplary optical fiber-based digital DAS configured to compatibly interface with at least one digital remote unit and at least one analog remote unit by adapting the analog RAU digital adaptor in FIG. 2 to communicate over at least one optical fiber-based communications medium.

The adaptive analog remote unit 28(1) can also be provided in an optical fiber-based digital DAS. Benefits of an optical fiber-based DAS include distributing digital communications over optical fiber, which supports higher bandwidths and low signal-to-noise ratios. In this regard, FIG. 4 is a schematic diagram of an exemplary optical fiber-based digital DAS 100 configured to compatibly interface with at least one digital remote unit 62(1) and the analog RAU 32 in FIG. 3 by adapting the analog RAU digital adaptor 30 in FIG. 2 to communicate over at least one optical fiber-based communications medium. Common elements between FIG. 2, FIG. 3, and FIG. 4 are shown therein with common element numbers, which will thus not be re-described herein.

The optical fiber-based digital DAS 100 comprises a digital HEE 64(1). The digital HEE 64(1) comprises at least one signal interface module 102 communicatively coupled to the communications signal source 66. In one non-limiting example, the signal interface module 102 may be a radio interface module (RIM) and the communications signal source 66 may be a BTS. In another non-limiting example, the signal interface module 102 may be a baseband interface module (BIM) and the communications signal source 66 may be a BBU. The signal interface module 102 is configured to exchange the uplink communications signal 68 and the downlink communications signal 70 with the communications signal source 66. The signal interface module 102 is communicatively coupled to at least one first optical interface module (OIM) 104 and at least one second OIM

106. The first OIM 104 is coupled to the digital RAU 72(1) over at least one first uplink optical fiber-based communications medium 108 and at least one first downlink optical fiber-based communications medium 110. The second OIM 106 is coupled to at least one second uplink optical fiber-based communications medium 112 and at least one second downlink optical fiber-based communications medium 114. The analog RAU digital adaptor 30(1) comprises at least one second E/O converter 116 and at least one second O/E converter 118. The second E/O converter 116 is coupled to the second uplink optical fiber-based communications medium 112 and the signal conversion circuit 46. The second O/E converter 118 is coupled to the second downlink optical fiber-based communications medium 114 and the signal conversion circuit 46.

With continuing reference to FIG. 4, the signal conversion circuit 46 receives and converts the uplink analog RF communications signal 90 into at least one second uplink digital communications signal 120. The second E/O converter 116 receives and converts the second uplink digital communications signal 120 into at least one second uplink digital optical communications signal 122, which is in turn provided to the second OIM 106 over the second uplink optical fiber-based communications medium 112. The second OIM 106 receives and converts the second uplink digital optical communications signal 122 back into the second uplink digital communications signal 120. The second uplink digital communications signal 120 is received by the signal interface module 102 and converted into the uplink communications signal 68 that is appropriate for transmission to the communications signal source 66.

With continuing reference to FIG. 4, upon receiving the downlink communications signal 70 that is destined for the adaptive analog remote unit 28(2), the signal interface module 102 turns the downlink communications signal 70 into at least one second downlink digital communications signal 124. The second OIM 106 receives and converts the second downlink digital communications signal 124 into at least one second downlink digital optical communications signal 126, which is provided to the analog RAU digital adaptor 30(1) over the second downlink optical fiber-based communications medium 114. The second O/E converter 118 in the analog RAU digital adaptor 30(1) receives and converts the second downlink digital optical communications signal 126 back into the second downlink digital communications signal 124. The signal conversion circuit 46 in turn receives and converts the second downlink digital communications signal 124 into the downlink analog RF communications signal 96, which is subsequently provided to the plurality of second client devices (now shown) by the analog RAU 32.

With continuing reference to FIG. 4, the digital RAU 72(1) receives the uplink digital RF communications signal 78 from the plurality of first client devices (not shown). The digital RAU 72(1) converts the uplink digital RF communications signal 78 into at least one first uplink digital optical communications signal 128, which is subsequently provided to the first OIM 104 over the first uplink optical fiber-based communications medium 108. The first OIM 104 then converts the first uplink digital optical communications signal 128 into at least one first uplink digital communications signal 130. The first uplink digital communications signal 130 is received by the signal interface module 102 and converted into the uplink communications signal 68 that is appropriate for transmission to the communications signal source 66.

With continuing reference to FIG. 4, when the signal interface module 102 receives the downlink communications signal 70 destined for the digital remote unit 62(1), the signal interface module 102 converts the downlink communications signal 70 into at least one first downlink digital communications signal 132. The first OIM 104 receives and converts the first downlink digital communications signal 132 into at least one first downlink digital optical communications signal 134. The first downlink digital optical communications signal 134 is provided to the digital RAU 72(1) over the first downlink optical fiber-based communications medium 110 and subsequently converted into the downlink digital RF communications signal 84 to be provided to the plurality of second client devices (not shown) as previously discussed in FIG. 2.

As illustrated above, it is possible to support the analog RAU 32 in the digital DAS 60 of FIG. 3 and the optical fiber-based digital DAS 100 of FIG. 4 by including the analog RAU digital adaptor 30 and 30(1), respectively, to provide conversions between the analog RF communications signals and the digital communications signals. Inside the analog RAU digital adaptors 30 and 30(1), the signal conversion circuit 46 is configured to carry out conversions between the analog RF communications signals and the digital communications signals. To further illustrate signal conversions happening inside the signal conversion circuit 46, FIGS. 5 and 6 are provided.

Figure 5:
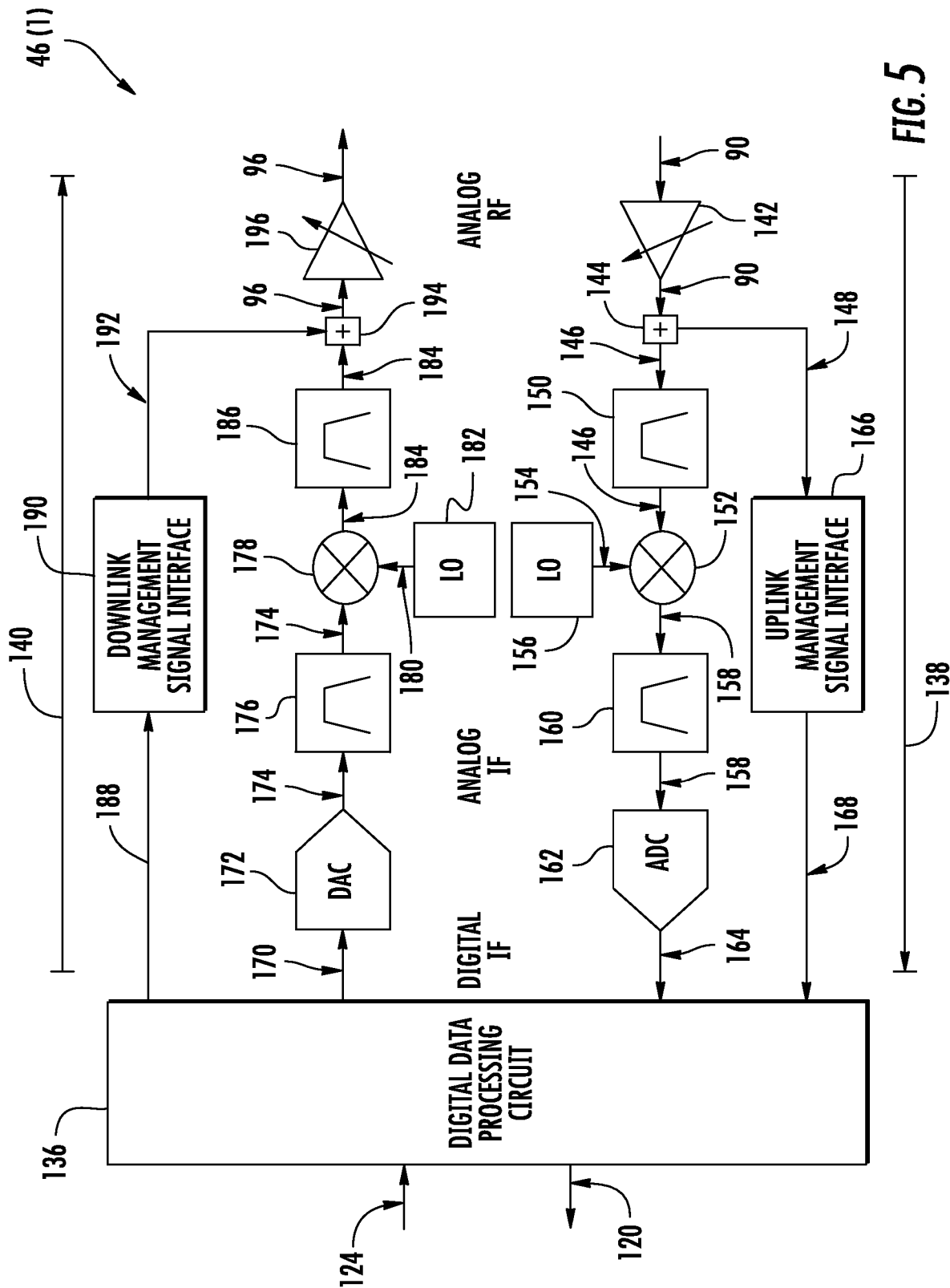
FIG. 5 is a schematic diagram of an exemplary signal conversion circuit, which can be provided in the analog RAU digital adaptor in FIGS. 3 and 4 to provide conversions between analog RF communications signals and digital communications signals by employing an intermediate frequency (IF) as an intermediate signal to enable the conversions.
Figure 6:
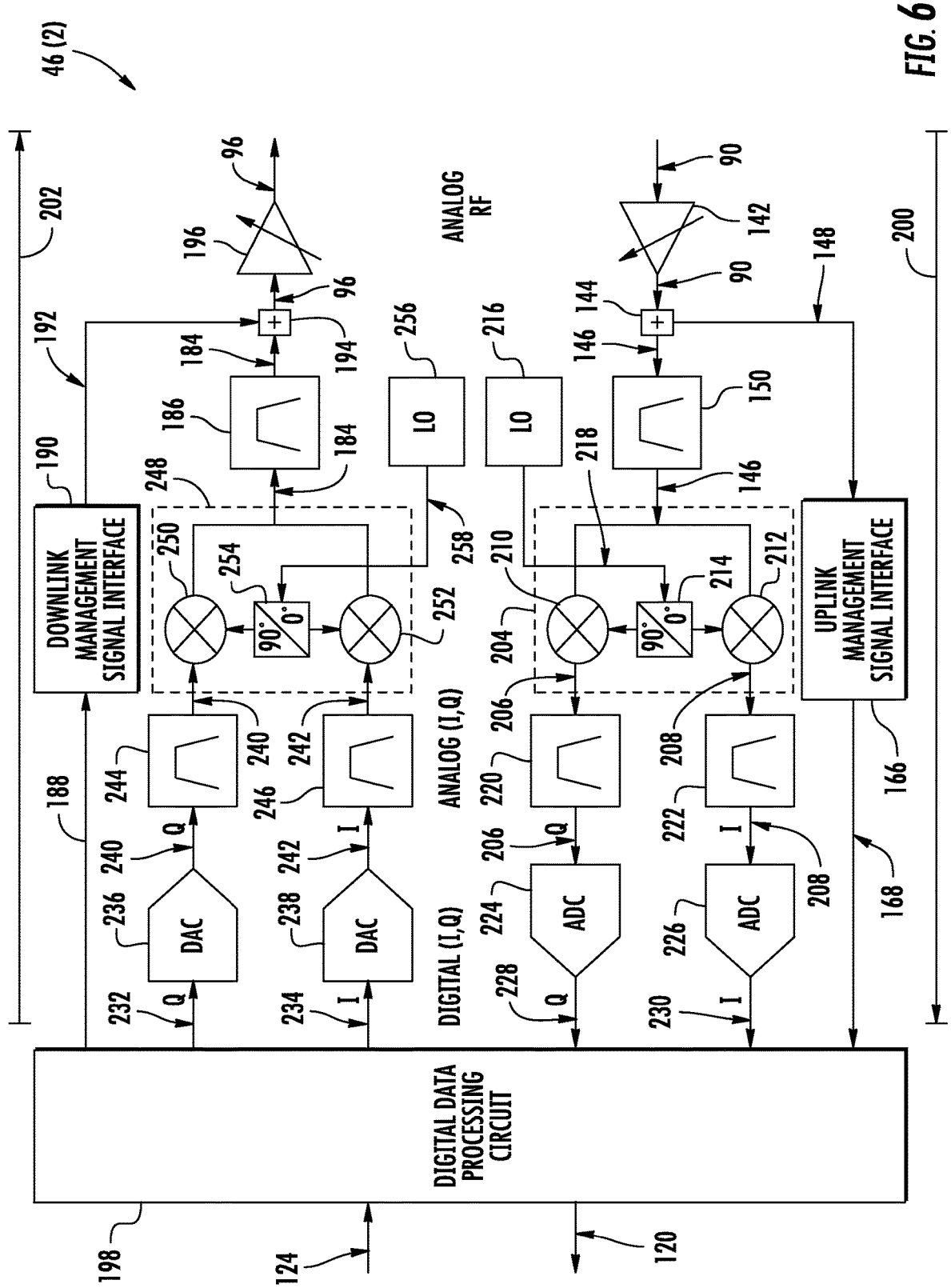
FIG. 6 is a schematic diagram of another exemplary signal conversion circuit, which can be provided in the analog RAU digital adaptor in FIGS. 3 and 4 to provide conversions between analog RF communications signals and digital communications signals by employing a quadrature (Q) signal and an in-phase (I) signal as intermediate signals to enable the conversions.

FIG. 5 is a schematic diagram of an exemplary signal conversion circuit 46(1), which can be provided in the analog RAU digital adaptor 30 in FIG. 3 and the analog RAU digital adaptor 30(1) in FIG. 4 to provide conversions between the analog RF communications signals and the digital communications signals by employing an intermediate frequency (IF) as an intermediate signal to enable the conversions. The signal conversion circuit 46(1) comprises a digital data processing circuit 136, an uplink signal processing path 138, and a downlink signal processing path 140. In a non-limiting example, the digital data processing circuit 136 may be a software function, a hardware element, or a combination of both. More specifically, the digital data processing circuit 136 may be a field programmable gate array (FPGA) circuit.

On the uplink signal processing path 138, an uplink variable gain amplifier 142 receives the uplink analog RF communications signal 90 from the first O/E converter 44 (not shown). The uplink variable gain amplifier 142 is configured to adjust the uplink analog RF communications signal 90 to a predetermined uplink power level. In a non-limiting example, the predetermined uplink power level is chosen in accordance to operating requirements of the signal conversion circuit 46(1). In another non-limiting example, the predetermined uplink power level is chosen based on uplink transmission power requirements of the digital DAS 60 of FIG. 3 or the optical fiber-based digital DAS 100 of FIG. 4. The uplink analog RF communications signal 90 is then provided to an uplink analog RF signal splitter 144, wherein the uplink analog RF communications signal 90 is split into at least one uplink analog RF data signal 146 and at least one uplink analog RF management signal 148. The uplink analog RF data signal 146 is received by an uplink RF signal filter 150, which is configured to remove or attenuate unwanted products and harmonics in the uplink analog RF data signal 146. An uplink modulator 152 receives the uplink analog RF data signal 146 after the uplink analog RF data signal 146 passes through the uplink RF signal filter 150. The uplink modulator 152 in turn modulates the uplink analog RF data signal 146 based on an uplink IF mixing frequency 154 provided by an uplink local oscillator 156 to generate at least one uplink analog IF data signal 158. An uplink IF signal filter 160 is provided to remove or attenuate unwanted products and harmonics from the uplink analog IF data signal 158. An analog-to-digital converter (ADC) 162 receives and converts the uplink analog IF data signal 158 into at least one uplink digital IF data signal 164. The uplink digital IF data signal 164 is then provided to the digital data processing circuit 136, where the uplink digital IF data signal 158 is demodulated to generate consecutive uplink data digital words (not shown).

The uplink analog RF management signal 148, on the other hand, is received by an uplink management signal interface 166, wherein the uplink analog RF management signal 148 is converted into at least one uplink digital management signal 168. The uplink digital management signal 168 is then provided to the digital data processing circuit 136, where the uplink digital management signal 168 is demodulated to generate consecutive uplink management digital words (not shown). The digital data processing circuit 136 is further configured to encapsulate the consecutive uplink data digital words (not shown) and the consecutive uplink management digital words (not shown) into formatted uplink data packets (not shown). In a non-limiting example, the formatted uplink data packets (not shown) may conform to a common public radio interface (CPRI) format, an Internet protocol (IP) format, or an Ethernet format. Subsequently, the digital data processing circuit 136 generates the second uplink digital communications signal 120 bearing the formatted uplink data packets (not shown).

With continuing reference to FIG. 5, on the downlink signal processing path 140, the digital data processing circuit 136 receives the second downlink digital communications signal 124 bearing formatted downlink data packets (not shown). In a non-limiting example, the formatted downlink data packets (not shown) may conform to the CPRI format, the IP format, or the Ethernet format. The digital data processing circuit 136 is configured to de-capsulate the formatted downlink data packets (not shown) into consecutive downlink data digital words (not shown) and consecutive downlink management digital words (not shown). The consecutive downlink data digital words (not shown) are then modulated to generate at least one downlink digital IF data signal 170. A digital-to-analog converter (DAC) 172 receives and converts the downlink digital IF data signal 170 to at least one downlink analog IF data signal 174. A downlink IF signal filter 176 is provided to remove or attenuate unwanted products and harmonics from the downlink analog IF data signal 174. A downlink modulator 178 is provided to receive the downlink analog IF data signal 174 after the downlink analog IF data signal 174 passes through the downlink IF signal filter 176. The downlink modulator 178 in turn modulates the downlink analog IF data signal 174 based on a downlink RF mixing frequency 180 provided by a downlink local oscillator 182 to generate at least one downlink analog RF data signal 184. By controlling the downlink RF mixing frequency 180, a center frequency of the downlink analog RF data signal 184 may be adjusted to match a RF frequency used by the analog RAU 32 (not shown). A downlink RF signal filter 186 is provided to remove or attenuate unwanted products and harmonics from the downlink analog RF data signal 184.

The consecutive downlink management digital words (not shown), on the other hand, are modulated at the digital data processing circuit 136 to generate at least one downlink digital management signal 188. A downlink management signal interface 190 receives and converts the downlink digital management signal 188 into at least one downlink analog RF management signal 192. Subsequently, a downlink analog RF signal combiner 194 combines the downlink analog RF data signal 184 and the downlink analog RF management signal 192 to generate the downlink analog RF communications signal 96. A downlink variable gain amplifier 196 then adjusts the downlink analog RF communications signal 96 to a predetermined downlink power level before providing to the first E/O converter 56 (not shown). In a non-limiting example, the predetermined downlink power level is chosen in accordance to transmission power requirements of the analog RAU 32.

Digital and analog IF signals used in the signal conversion circuit 46(1) of FIG. 5 are often carefully chosen to avoid interference with the uplink analog RF communications signal 90 and the downlink analog RF communications signal 96. Signal processing qualities in the signal conversion circuit 46(1) will improve as a result. In addition, the digital and analog IF signals may also be chosen to have a higher bandwidth, which may lead to improved performance and throughput during signal processing by the signal conversion circuit 46(1). However, using digital and analog IF signals for conversions between the analog RF communications signals and the digital communications signals typically increases complexity of the digital data processing circuit 136 and may increase the cost of the signal conversion circuit 46(1) as a whole. As a lower cost alternative to the signal conversion circuit 46(1) of FIG. 5, FIG. 6 is a schematic diagram of another exemplary signal conversion circuit 46(2), which can be provided in the analog RAU digital adaptor 30 in FIG. 3 and the analog RAU digital adaptor 30(1) in FIG. 4 to provide conversions between the analog RF communications signals and the digital communications signals by employing a quadrature (Q) signal and an in-phase (I) signal as intermediate signals to enable the conversions. Common elements between the signal conversion circuit 46(1) of FIG. 5 and the signal conversion circuit 46(2) of FIG. 6 are shown therein with common element numbers, and thus will not be re-described herein.

The signal conversion circuit 46(2) comprises a digital data processing circuit 198, an uplink signal processing path 200, and a downlink signal processing path 202. In a non-limiting example, the digital data processing circuit 198 may be a software function, a hardware element, or a combination of both. More specifically, the digital data processing circuit 198 may be another FPGA circuit.

On the uplink signal processing path 200, the uplink analog RF data signal 146 is received by an uplink quadrature demodulator 204 and separated into at least one uplink analog Q data signal 206 and at least one uplink analog I data signal 208. In a non-limiting example, the uplink quadrature demodulator 204 comprises an uplink Q signal demodulator 210 and an uplink I signal demodulator 212. An uplink phase shifter 214 is coupled to the uplink Q signal demodulator 210 and the uplink I signal demodulator 212 to provide orthogonality between the uplink analog Q data signal 206 and the uplink analog I data signal 208. The uplink quadrature demodulator 204 also comprises an uplink local oscillator 216, which is coupled to the uplink phase shifter 214 and configured to provide an uplink mixing frequency 218. An uplink Q signal filter 220 and an uplink I signal filter 222 are provided to remove or attenuate unwanted products and harmonics from the uplink analog Q data signal 206 and the uplink analog I data signal 208, respectively. Subsequently, an uplink Q signal ADC 224 and an uplink I signal ADC 226 are provided on the uplink signal processing path 200 to convert the uplink analog Q data signal 206 and the uplink analog I data signal 208 into at least one uplink digital Q data signal 228 and at least one uplink digital I data signal 230, respectively. The uplink digital Q data signal 228 and the uplink digital I data signal 230 are received by the digital data processing circuit 198 and demodulated to generate consecutive uplink data digital words (not shown) represented in at least one uplink Q data stream (not shown) and at least one uplink I data stream (not shown), respectively. The digital data processing circuit 198 is further configured to encapsulate the consecutive uplink data digital words (not shown) and the consecutive uplink management digital words (not shown) into formatted uplink data packets (not shown). In a non-limiting example, the formatted uplink data packets (not shown) may conform to the CPRI format, the IP format, or the Ethernet format. Subsequently, the digital data processing circuit 198 generates the second uplink digital communications signal 120 bearing the formatted uplink data packets (not shown).

With continuing reference to FIG. 6, on the downlink signal processing path 202, the digital data processing circuit 198 receives the second downlink digital communications signal 124 carrying formatted downlink data packets (not shown). In a non-limiting example, the formatted downlink data packets (not shown) may conform to the CPRI format, the IP format, or the Ethernet format. The digital data processing circuit 198 is configured to de-capsulate the formatted downlink data packets (not shown) into consecutive downlink digital words (not shown) represented in at least one downlink Q data stream (not shown) and at least one downlink I data stream (not shown). The at least one downlink Q data stream (not shown) and at least one downlink I data stream (not shown) are then modulated at the digital data processing circuit 198 to generate at least one downlink digital Q data signal 232 and at least one downlink digital I data signal 234, respectively. A downlink Q signal DAC 236 and a downlink I signal DAC 238 are provided on the downlink signal processing path 202 to convert the downlink digital Q data signal 232 and the downlink digital I data signal 234 into at least one downlink analog Q data signal 240 and at least one downlink analog I data signal 242, respectively. A downlink Q signal filter 244 and a downlink I signal filter 246 are provided to remove or attenuate unwanted products and harmonics from the downlink analog Q data signal 240 and the downlink analog I data signal 242, respectively. A downlink quadrature modulator 248 in turn combines the downlink analog Q data signal 240 and the downlink analog I data signal 242 to generate the downlink analog RF data signal 184. In a non-limiting example, the downlink quadrature modulator 248 comprises a downlink Q signal modulator 250 and a downlink I signal modulator 252. A downlink phase shifter 254 is coupled to the downlink Q signal modulator 250 and the downlink I signal modulator 252 to provide orthogonality between the downlink analog Q data signal 240 and the downlink analog I data signal 242. The downlink quadrature modulator 248 also comprises a downlink local oscillator 256, which is coupled to the downlink phase shifter 254 and configured to provide a downlink RF mixing frequency 258. By controlling the downlink RF mixing frequency 258, a center frequency of the downlink analog RF data signal 184 may be adjusted to match a RF frequency used by the analog RAU 32. Subsequently, the downlink analog RF signal combiner 194 combines the downlink analog RF data signal 184 and the downlink analog RF management signal 192 to generate the downlink analog RF communications signal 96.

Figure 7A:
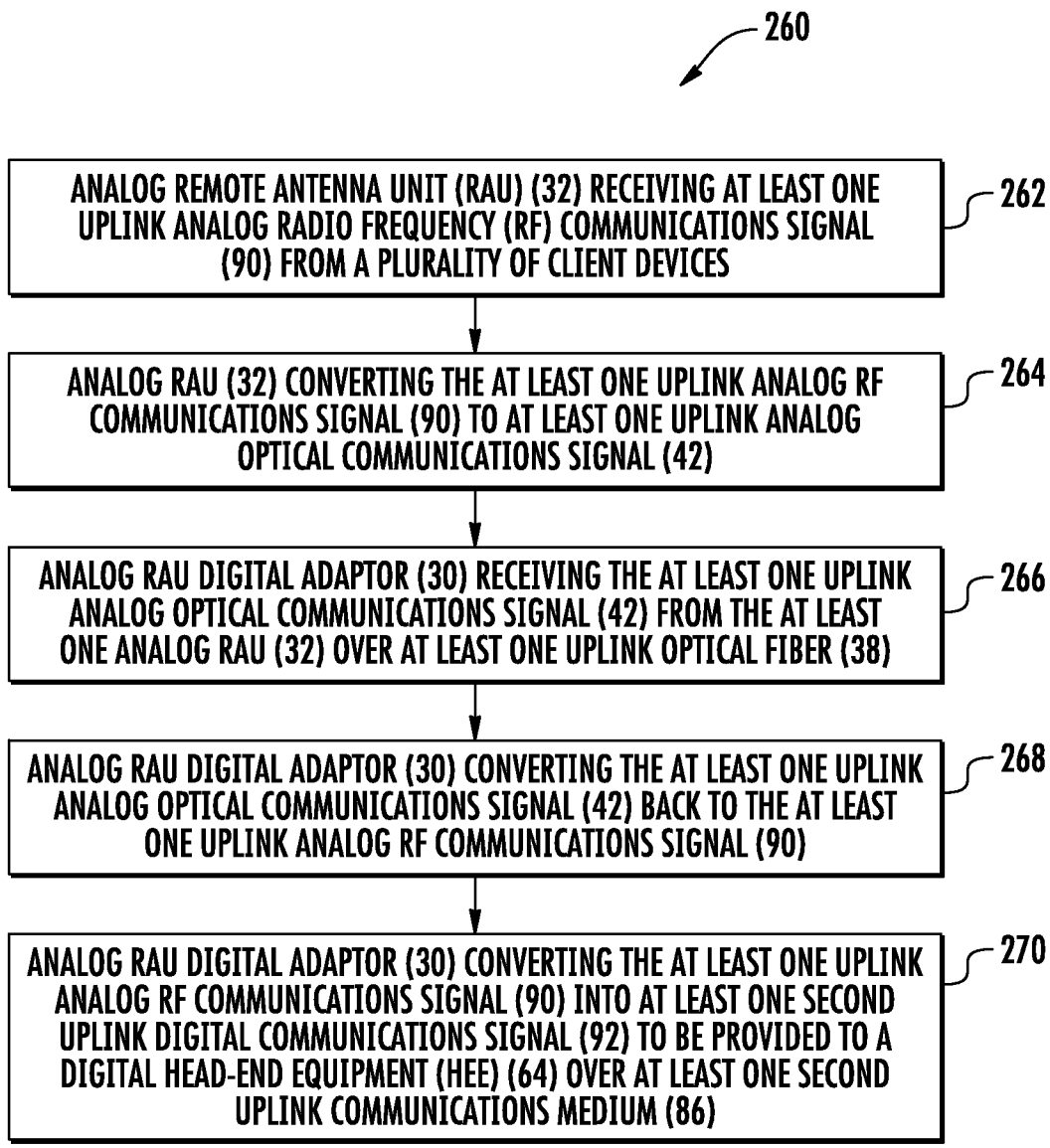
FIG. 7A is a flowchart of an exemplary uplink signaling process for supporting uplink analog RF communications signals transmissions from the analog RAU to the digital DAS in FIGS. 3 and 4 by converting uplink analog RF communications signals to uplink digital communications signals.

FIG. 7A is a flowchart of an exemplary uplink signaling process 260 for supporting uplink analog RF communications signals transmissions from the analog RAU 32 to the digital DAS 60 of FIG. 3 and the optical fiber-based digital DAS 100 of FIG. 4 by converting the uplink analog RF communications signals into uplink digital communications signals. According to the uplink signaling process 260, the analog RAU 32 receives the uplink analog RF communications signal 90 from a plurality of client devices (block 262). The analog RAU 32 converts the uplink analog RF communications signal 90 to the uplink analog optical communications signal 42 (block 264). The analog RAU digital adaptor 30 receives the uplink analog optical communications signal 42 from the analog RAU 32 over the uplink optical fiber 38 (block 266). The analog RAU digital adaptor 30 then converts the uplink analog optical communications signal 42 back to the uplink analog RF communications signal 90 (block 268). Subsequently, the analog RAU digital adaptor 30 converts the uplink analog RF communications signal 90 into the second uplink digital communications signal 92 to be provided to the digital HEE 64 over the second uplink communications medium 86 (block 270).

Figure 7B:
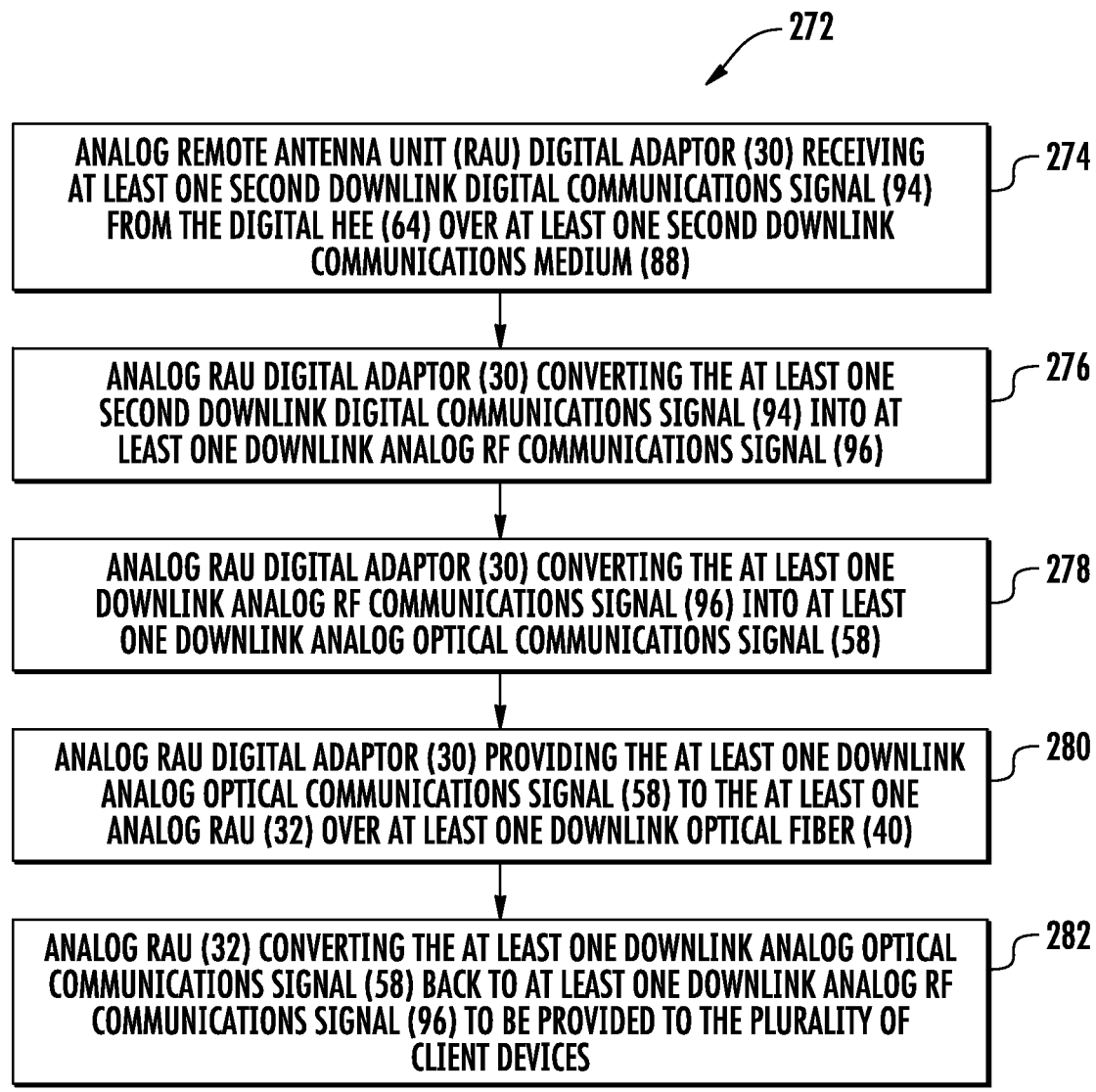
FIG. 7B is a flowchart of an exemplary downlink signaling process for supporting downlink digital communications signals transmissions from the digital DAS to the analog RAU in FIGS. 3 and 4 by converting downlink digital communications signals to downlink analog RF communications signals.

FIG. 7B is a flowchart of an exemplary downlink signaling process 272 for supporting downlink digital communications signals transmissions from the digital DAS 60 of FIG. 3 and the optical fiber-based digital DAS 100 of FIG. 4 to the analog RAU 32 by converting downlink digital communications signals to downlink analog RF communications signals. According to the downlink signaling process 272, the analog RAU digital adaptor 30 receives the second downlink digital communications signal 94 from the digital HEE 64 over the second downlink communications medium 88 (block 274). The analog RAU digital adaptor 30 converts the second downlink digital communications signal 94 into at least one downlink analog RF communications signal 96 (block 276). The analog RAU digital adaptor 30 in turn converts the downlink analog RF communications signal 96 into the downlink analog optical communications signal 58 (block 278). The analog RAU digital adaptor 30 then provides the downlink analog optical communications signal 58 to the analog RAU 32 over the downlink optical fiber 40 (block 280). Subsequently, the analog RAU 32 converts the downlink analog optical communications signal 58 back to the downlink analog RF communications signal 96 to be provided to the plurality of client devices (block 282).

Figure 8:
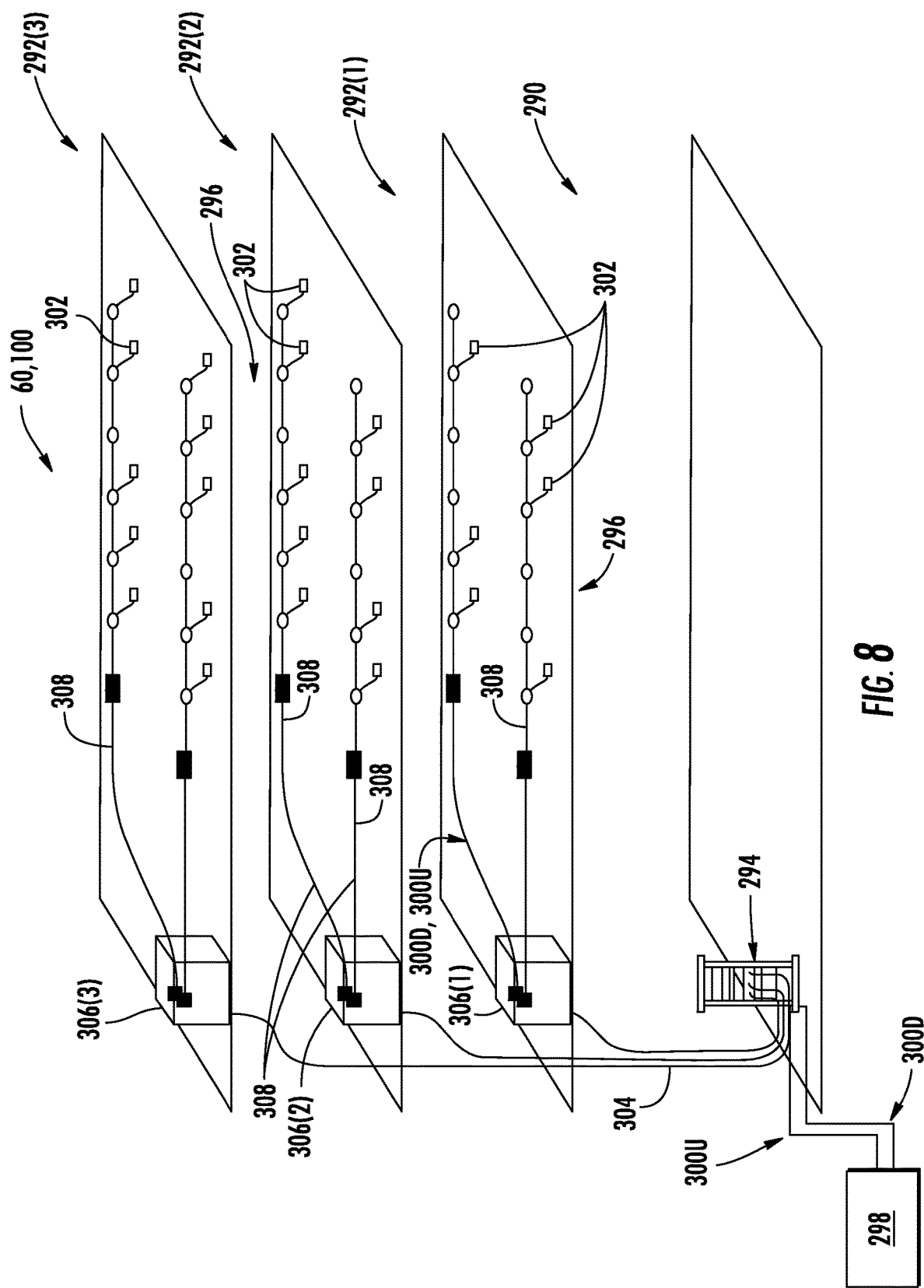
FIG. 8 is a partially schematic cut-away diagram of an exemplary building infrastructure in which a digital DAS, including the digital DASs in FIGS. 3 and 4, that can compatibly interface with an adaptive analog remote unit and a digital remote unit can be employed.

The digital DAS 60 of FIG. 3 and the optical fiber-based digital DAS 100 of FIG. 4 may be provided in an indoor environment, as illustrated in FIG. 8. FIG. 8 is a partially schematic cut-away diagram of an exemplary building infrastructure in which a digital DAS, including the digital DASs in FIGS. 3 and 4, which includes the analog RAU digital adaptor 30 in FIG. 3 and the analog RAU digital adaptor 30(1) in FIG. 4 to support the analog RAU 32, can be employed. The building infrastructure 290 in this embodiment includes a first (ground) floor 292(1), a second floor 292(2), and a third floor 292(3). The floors 292(1)-292(3) are serviced by a central unit 294 to provide antenna coverage areas 296 in the building infrastructure 290. The central unit 294 is communicatively coupled to the base station 298 to receive downlink communications signals 300D from the base station 298. The central unit 294 is communicatively coupled to remote antenna units 302 to receive uplink communications signals 300U from the remote antenna units 302, as previously discussed above. The downlink and uplink communications signals 300D, 300U communicated between the central unit 294 and the remote antenna units 302 are carried over a riser cable 304. The riser cable 304 may be routed through interconnect units (ICUs) 306(1)-306(3) dedicated to each of the floors 292(1)-292(3) that route the downlink and uplink communications signals 300D, 300U to the remote antenna units 302 and also provide power to the remote antenna units 302 via array cables 308.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for supporting an analog remote antenna unit (RAU) in a digital distributed antenna system (DAS), comprising:
   receiving at least one uplink analog radio frequency (RF) communications signal by at least one analog RAU from a plurality of client devices;
   converting the at least one uplink analog RF communications signal into at least one uplink analog optical communications signal to be provided to at least one analog RAU digital adaptor over at least one uplink optical fiber;
   receiving the at least one uplink analog optical communications signal by the at least one analog RAU digital adaptor;
   converting the at least one uplink analog optical communications signal back into the at least one uplink analog RF communications signal; and
   converting the at least one uplink analog RF communications signal into at least one uplink digital communications signal to be distributed in the digital DAS, wherein the at least one uplink digital communications signal carries formatted uplink data packets.

2. The method of claim 1, further comprising:
   receiving at least one downlink digital communications signal by the at least one analog RAU digital adaptor from the digital DAS, wherein the at least one downlink digital communications signal carries formatted downlink data packets;
   converting the at least one downlink digital communications signal into at least one downlink analog RF communications signal;
   converting the at least one downlink analog RF communications signal into at least one downlink analog optical communications signal to be provided to the at least one analog RAU over at least one downlink optical fiber;
   receiving the at least one downlink analog optical communications signal by the at least one analog RAU; and
   converting the at least one downlink analog optical communications signal back to the at least one downlink analog RF communications signal to be provided to the plurality of client devices.

3. The method of claim 2, further comprising converting the at least one uplink digital communications signal into at least one uplink digital optical communications signal to be distributed to an optical fiber-based digital DAS.

4. The method of claim 2, further comprising converting at least one downlink digital optical communications signal received from an optical fiber-based digital DAS into the at least one downlink digital communications signal.

5. The method of claim 2, wherein the formatted uplink data packets are configured to be in compliance with a common public radio interface (CPRI) packet format, an Internet protocol (IP) packet format, or an Ethernet packet format.

6. The method of claim 2, wherein the formatted downlink data packets are configured to be in compliance with a common public radio interface (CPRI) packet format, an Internet protocol (IP) packet format, or an Ethernet packet format.

7. The method of claim 1, wherein converting the at least one uplink analog RF communications signal into the at least one uplink digital communications signal comprises:
   adjusting the at least one uplink analog RF communications signal to a predetermined uplink power level;
   splitting the at least one uplink analog RF communications signal to generate at least one uplink analog RF data signal;
   attenuating unwanted products and harmonics in the at least one uplink analog RF data signal;
   modulating the at least one uplink analog RF data signal to generate at least one uplink analog intermediate frequency (IF) data signal;
   attenuating unwanted products and harmonics in the at least one uplink analog IF data signal;
   converting the at least one uplink analog IF data signal into at least one uplink digital IF data signal;
   demodulating the at least one uplink digital IF data signal to generate consecutive uplink data digital words; and
   encapsulating the consecutive uplink data digital words into formatted uplink data packets.

8. The method of claim 7, further comprising:
   splitting the at least one uplink analog RF communications signal to generate at least one uplink analog RF management signal;
   converting the at least one uplink analog RF management signal into at least one uplink digital management signal;
   demodulating the at least one uplink digital management signal to generate consecutive uplink management digital words;
   encapsulating the consecutive uplink management digital words into the formatted uplink data packets; and
   providing the formatted uplink data packets in the at least one uplink digital communications signal.

9. The method of claim 2, wherein converting the at least one downlink digital communications signal into the at least one downlink analog RF communications signal comprises:
   receiving the formatted downlink data packets in the at least one downlink digital communications signal;
   decapsulating the formatted downlink data packets to generate consecutive downlink data digital words;
   modulating the consecutive downlink data digital words to generate at least one downlink digital intermediate frequency (IF) data signal;
   converting the at least one downlink digital IF data signal into at least one downlink analog IF data signal;
   attenuating unwanted products and harmonics in the at least one downlink analog IF data signal;
   modulating the at least one downlink analog IF data signal to generate at least one downlink analog RF data signal; and attenuating unwanted products and harmonics in the at least one downlink analog RF data signal.

10. The method of claim 9, further comprising:
decapsulating the formatted downlink data packets to generate consecutive downlink management digital words;
modulating the consecutive downlink management digital words to generate at least one downlink digital management signal;
converting the at least one downlink digital management signal into at least one downlink analog RF management signal;
combining the at least one downlink analog RF management signal and the at least one downlink analog RF data signal to generate the at least one downlink analog RF communications signal; and
adjusting the at least one downlink analog RF communications signal to a predetermined downlink power level.

11. The method of claim 1, wherein converting the at least one uplink analog RF communications signal into the at least one uplink digital communications signal comprises:
adjusting the at least one uplink analog RF communications signal to a predetermined uplink power level;
splitting the at least one uplink analog RF communications signal to generate at least one uplink analog RF data signal;
attenuating unwanted products and harmonics in the at least one uplink analog RF data signal;
demodulating the at least one uplink analog RF data signal to generate at least one uplink analog quadrature (Q) data signal and at least one uplink analog in-phase (I) data signal;
attenuating unwanted products and harmonics in the at least one uplink analog Q data signal and the at least one uplink analog I data signal;
converting the at least one uplink analog Q data signal and the at least one uplink analog I data signal into at least one uplink digital Q data signal and at least one uplink digital I data signal, respectively;
demodulating the at least one uplink digital Q data signal and the at least one uplink digital I data signal to generate consecutive uplink data digital words represented in at least one uplink Q data stream and at least one uplink I data stream, respectively; and
encapsulating the at least one uplink Q data stream and the at least one uplink I data stream into formatted uplink data packets.

12. The method of claim 11, further comprising:
splitting the at least one uplink analog RF communications signal to generate at least one uplink analog RF management signal;
converting the at least one uplink analog RF management signal into at least one uplink digital management signal;
demodulating the at least one uplink digital management signal to generate consecutive uplink management digital words;
encapsulating the consecutive uplink management digital words into the formatted uplink data packets; and
providing the formatted uplink data packets in the at least one uplink digital communications signal.

13. The method of claim 2, wherein converting the at least one downlink digital communications signal into the at least one downlink analog RF communications signal further comprises:

receiving formatted downlink data packets in the at least one downlink digital communications signal;
decapsulating the formatted downlink data packets to generate consecutive downlink data digital words represented in at least one downlink quadrature (Q) data stream and at least one downlink in-phase (I) data stream;
modulating the at least one downlink Q data stream and the at least one downlink I data stream to generate at least one downlink digital Q data signal and at least one downlink digital I data signal, respectively;
converting the at least one downlink digital Q data signal and the at least one downlink digital I data signal into at least one downlink analog Q data signal and at least one downlink analog I data signal, respectively;
attenuating unwanted products and harmonics in the at least one downlink analog Q data signal and the at least one downlink analog I data signal;
modulating the at least one downlink analog Q data signal and the at least one downlink analog I data signal to generate at least one downlink analog RF data signal; and
attenuating unwanted products and harmonics in the at least one downlink analog RF data signal.

14. The method of claim 13, further comprising:
decapsulating the formatted downlink data packets to generate consecutive downlink management digital words;
modulating the consecutive downlink management digital words to generate at least one downlink digital management signal;
converting the at least one downlink digital management signal into at least one downlink analog RF management signal;
combining the at least one downlink analog RF management signal and the at least one downlink analog RF data signal to generate the at least one downlink analog RF communications signal; and
adjusting the at least one downlink analog RF communications signal to a predetermined downlink power level.

15. An adaptive analog remote unit for a digital distributed antenna system (DAS), comprising:
at least one analog remote antenna unit (RAU) configured to:
receive at least one uplink analog radio frequency (RF) communications signal from at least one client device; and
convert the at least one uplink analog RF communications signal into at least one uplink analog optical communications signal;
at least one analog RAU digital adaptor coupled to the at least one analog RAU over at least one uplink optical fiber;
wherein the at least one analog RAU is configured to provide the at least one uplink analog optical communications signal to the at least one analog RAU digital adaptor; and
the at least one analog RAU digital adaptor configured to:
receive the at least one uplink analog optical communications signal from the at least one analog RAU over the at least one uplink optical fiber; and
convert the at least one uplink analog optical communications signal into at least one uplink digital communications signal; and distribute the at least one uplink digital communications signal over at least one uplink communications medium to a digital head-end equipment (HEE) in the digital DAS, wherein the at least one analog RAU digital adaptor comprises:
   at least one first optical-to-electrical (O/E) converter coupled to the at least one uplink optical fiber; and
   at least one first electrical-to-optical (E/O) converter coupled to at least one downlink optical fiber; and wherein the at least one analog RAU is coupled to the at least one analog RAU digital adaptor over the at least one uplink optical fiber and the at least one downlink optical fiber, wherein the at least one analog RAU digital adaptor further comprises:

an uplink variable gain amplifier coupled to the at least one first O/E converter;
an uplink analog radio frequency (RF) signal splitter coupled to the uplink variable gain amplifier;
an uplink RF signal filter coupled to the uplink analog RF signal splitter;
an uplink modulator coupled to the uplink RF signal filter;
an uplink local oscillator coupled to the uplink modulator;
an uplink intermediate frequency (IF) signal filter coupled to the uplink modulator;
an analog-to-digital converter (ADC) coupled to the uplink IF signal filter;
a digital data processing circuit coupled to the ADC; and
an uplink management signal interface coupled to the uplink analog RF signal splitter and the digital data processing circuit.

16. The adaptive analog remote unit of claim 15, wherein the at least one analog RAU digital adaptor further comprises:
   a digital-to-analog converter (DAC) coupled to the digital data processing circuit;
   a downlink IF signal filter coupled to the DAC;
   a downlink modulator coupled to the downlink IF signal filter;
   a downlink local oscillator coupled to the downlink modulator;
   a downlink RF signal filter coupled to the downlink modulator;
   a downlink analog RF signal combiner coupled to the downlink RF signal filter;
   a downlink management signal interface coupled to the digital data processing circuit and the downlink analog RF signal combiner; and
   a downlink variable gain amplifier coupled to the downlink analog RF signal combiner and the at least one first E/O converter.

17. An adaptive analog remote unit for a digital distributed antenna system (DAS), comprising:
   at least one analog remote antenna unit (RAU) configured to:
      receive at least one uplink analog radio frequency (RF) communications signal from at least one client device; and
      convert the at least one uplink analog RF communications signal into at least one uplink analog optical communications signal;
   at least one analog RAU digital adaptor coupled to the at least one analog RAU over at least one uplink optical fiber;
   wherein the at least one analog RAU is configured to provide the at least one uplink analog optical communications signal to the at least one analog RAU digital adaptor; and
   the at least one analog RAU digital adaptor configured to:
      receive the at least one uplink analog optical communications signal from the at least one analog RAU over the at least one uplink optical fiber; and
      convert the at least one uplink analog optical communications signal into at least one uplink digital communications signal; and
      distribute the at least one uplink digital communications signal over at least one uplink communications medium to a digital head-end equipment (HEE) in the digital DAS, wherein:
   the at least one analog RAU digital adaptor comprises:
      at least one first optical-to-electrical (O/E) converter coupled to the at least one uplink optical fiber; and
      at least one first electrical-to-optical (E/O) converter coupled to at least one downlink optical fiber; and
   wherein the at least one analog RAU is coupled to the at least one analog RAU digital adaptor over the at least one uplink optical fiber and the at least one downlink optical fiber,
   wherein the at least one analog RAU digital adaptor further comprises:
   an uplink variable gain amplifier coupled to the at least one first O/E converter;
   an uplink analog RF signal splitter coupled to the uplink variable gain amplifier;
   an uplink RF signal filter coupled to the uplink analog RF signal splitter;
   an uplink quadrature demodulator, further comprising:
      an uplink quadrature (Q) signal demodulator coupled to the uplink RF signal filter;
      an uplink in-phase (I) signal demodulator coupled to the uplink RF signal filter;
      an uplink phase shifter coupled to the uplink Q signal demodulator and the uplink I signal demodulator; and
      an uplink local oscillator coupled to the uplink phase shifter;
   an uplink Q signal filter coupled to the uplink Q signal demodulator;
   an uplink I signal filter coupled to the uplink I signal demodulator;
   an uplink Q signal analog-to-digital converter (ADC) coupled to the uplink Q signal filter;
   an uplink I signal ADC coupled to the uplink I signal filter;
   a digital data processing circuit coupled to the uplink Q signal ADC and the uplink I signal ADC; and
   an uplink management signal interface coupled to the uplink analog RF signal splitter and the digital data processing circuit,
   wherein the at least one analog RAU digital adaptor further comprises:
   a downlink Q signal digital-to-analog converter (DAC) coupled to the digital data processing circuit;
   a downlink I signal DAC coupled to the digital data processing circuit;
   a downlink Q signal filter coupled to the downlink Q signal DAC;
   a downlink I signal filter coupled to the downlink I signal DAC;

a downlink quadrature modulator, comprising:
  a downlink Q signal modulator coupled to the downlink Q signal filter;
  a downlink I signal modulator coupled to the downlink I signal filter;
  a downlink phase shifter coupled to the downlink Q signal modulator and the downlink I signal modulator; and
  a downlink local oscillator coupled to the downlink phase shifter;
a downlink RF signal filter coupled to the downlink Q signal modulator and the downlink I signal modulator;
a downlink analog RF signal combiner coupled the downlink RF signal filter;
a downlink management signal interface coupled to the digital data processing circuit and the downlink analog RF signal combiner; and
a downlink variable gain amplifier coupled to the downlink analog RF signal combiner and the at least one first E/O converter.

* * * * *

UNITED STATES PATENT AND TRADEMARK OFFICE
CERTIFICATE OF CORRECTION

PATENT NO. : 10,659,163 B2
APPLICATION NO. : 14/496507
DATED : May 19, 2020
INVENTOR(S) : Gavriel Magnezi Page 1 of 1

It is certified that error appears in the above-identified patent and that said Letters Patent is hereby corrected as shown below:

On the Title Page

On page 4, Column 1, item (56), U.S. patent documents, Line 22, delete "7,664,709" and insert -- 7,684,709 --, therefor.

On page 6, Column 1, item (56), U.S. patent documents, Line 25, delete "Star et al." and insert -- Sfar et al. --, therefor.

On page 9, Column 2, item (56), other publications, Line 25, delete "PCT/1L2015/050970," and insert -- PCT/IL2015/050970, --, therefor.

On page 9, Column 2, item (56), other publications, Line 52, after "project,"" insert -- IET --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*